US012703476B2

(12) United States Patent
Ni et al.

(10) Patent No.: US 12,703,476 B2
(45) Date of Patent: Aug. 11, 2026

(54) METHODS AND SYSTEMS FOR AIRFOIL PROGNOSTICS USING PHYSICS-INFORMED MACHINE LEARNING

(71) Applicant: The Boeing Company, Arlington, VA (US)

(72) Inventors: Kangyu Ni, Calabasas, CA (US); Tsai-Ching Lu, Thousand Oaks, CA (US)

(73) Assignee: The Boeing Company, Arlington, VA (US)

( * ) Notice: Subject to any disclaimer, the term of this patent is extended or adjusted under 35 U.S.C. 154(b) by 222 days.

(21) Appl. No.: 18/332,650

(22) Filed: Jun. 9, 2023

(65) Prior Publication Data

US 2024/0409200 A1 Dec. 12, 2024

(51) Int. Cl.
*B64C 3/14* (2006.01)
*B64D 45/00* (2006.01)

(52) U.S. Cl.
CPC ................ *B64C 3/14* (2013.01); *B64D 45/00* (2013.01); *B64D 2045/0085* (2013.01)

(58) Field of Classification Search
None
See application file for complete search history.

(56) References Cited

U.S. PATENT DOCUMENTS

2019/0147412 A1* 5/2019 Chiaramonte ......... G06Q 10/20 705/7.13
2020/0320176 A1* 10/2020 Kaushik ................. G06N 3/084
2023/0062600 A1* 3/2023 Topac ..................... G06N 3/042
2023/0144150 A1* 5/2023 Gaudern ................ F03D 80/50 700/286

OTHER PUBLICATIONS

Lye, K. et al., "Interactive Surrogate Model Optimization (ISMO): An active learning algorithm for PDE constrained optimization with deep neural networks." Computer Methods in Applied Mechanics and Engineering, vol. 374, Aug. 13, 2020, 28 pages.
Li, J. et al., "Machine Learning in Aerodynamic Shape Optimization," Progress in Aerospace Sciences, vol. 134, Dec. 5, 2022, 103 pages.
European Patent Office, Extended European Search Report Issued in Application No. 24177320.9, Nov. 19, 2024, Germany, 7 pages.

(Continued)

*Primary Examiner* — Brian P Sweeney
*Assistant Examiner* — Jonathan E Reinert
(74) *Attorney, Agent, or Firm* — Alleman Hall LLP

(57) ABSTRACT

Methods and systems for airfoil prognostics using physics-informed machine learning introduce perturbations to a nominal airfoil geometry, simulating potential faults. The perturbed airfoil geometries are processed by physics-informed neural network (PINN) models, trained on geometric and physics-based features, to predict lift coefficients, thereby predicting the health status of the airfoil. A fault probing strategy is applied to assess health status under mission-specific requirements, predicting a remaining useful life and confidence bounds for each mission-specific requirement. Efficient airfoil health prediction, including precise fault simulation, allow for proactive maintenance planning based on the predicted health status of the airfoil.

20 Claims, 22 Drawing Sheets

(56) References Cited

OTHER PUBLICATIONS

Howlett, J., "NASA Contractor Report 166309," National Aeronautics and Space Administration, Dec. 1981, 361 pages.
Saetti, U. et al., "Flight Simulation and Control using the Julia Language," Proceedings of the 2022 AIAA SciTech Forum, Jan. 3, 2022, San Diego, CA, 17 pages.
Horn, J., "Non-Linear Dynamic Inversion Control Design for Rotorcraft," Aerospace, vol. 6, No. 3, Mar. 18, 2019, 25 pages.
Duru, C. et al., "CNNFOIL: convolutional encoder decoder modeling for pressure fields around airfoils," Neural Computing and Applications, vol. 33, No. 12, Nov. 6, 2020, 15 pages.
Pawar, S. et al., "Physics guided machine learning using simplified theories," Physics of Fluids, vol. 33, No. 1, Jan. 8, 2021, 7 pages.

* cited by examiner

METHODS AND SYSTEMS FOR AIRFOIL PROGNOSTICS USING PHYSICS-INFORMED MACHINE LEARNING

FIELD

The present invention relates generally to airfoils, and more particularly to the evaluation of the health statuses of airfoils.

BACKGROUND

Traditionally, the intricate nature of rotor aerodynamics, characterized by a multitude of interdependent equations and variables, has made the accurate and efficient analysis of airfoils a formidable challenge. Notably, the General Helicopter (GenHel) flight dynamics simulation model, a high-fidelity model known for its comprehensive representation of physics equations, pre-computed data, and look-up tables for efficiency, exemplifies this complexity. For instance, the GenHel model encapsulates the dynamics of rigid flap and lead-lag rotor blades, which are dependent on airfoil lift and drag coefficient look-up tables derived from wind tunnel experiments or high-fidelity numerical simulations like Computational Fluid Dynamics (CFD). Given the inherent limitations, it is not practical to generate exhaustive look-up tables for all conceivable nominal and perturbed airfoil shapes or to carry out costly CFD simulations for every airfoil shape of interest to evaluate the prognostics of each airfoil. Furthermore, in real-world vertical lift operations, rotor blades can sustain damage, potentially causing deviations in lift coefficients from the expected specifications.

SUMMARY

In view of the above, a computing system is provided, comprising a processor, and a memory storing executable instructions that, when executed by the processor, cause the processor to execute an impending fault simulator configured to receive input of a nominal airfoil geometry of an airfoil, simulate impending faults in the airfoil by perturbing the nominal airfoil geometry to generate perturbed airfoil geometries, and input the perturbed airfoil geometries into one or more physics-informed neural network (PINN) models to generate respective predicted airfoil lift coefficients for the perturbed airfoil geometries; and a health status evaluator configured to generate a predicted health status for the airfoil based on the predicted airfoil lift coefficients for the perturbed airfoil geometries, thereby leveraging physics-informed machine learning for efficiently generating airfoil prognostics.

The features, functions, and advantages that have been discussed can be achieved independently in various embodiments or can be combined in yet other embodiments, further details of which can be seen with reference to the following description and drawings.

DETAILED DESCRIPTION

In view of the above issues, the present disclosure describes systems and methods for predicting lift coefficients of airfoils and evaluating their health statuses, thereby enhancing both the safety and efficiency of aerospace operations.

Figure 1:
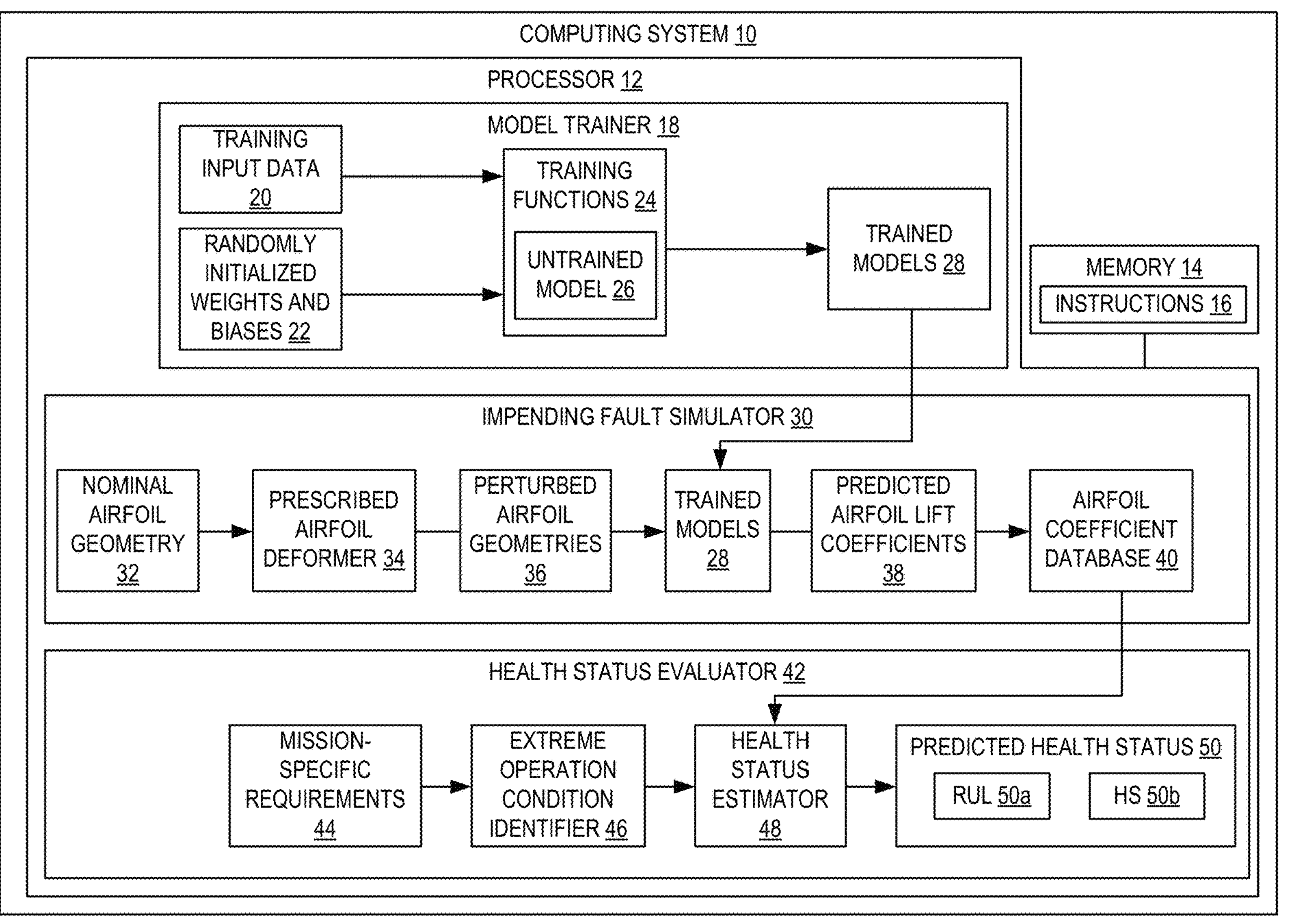
FIG. 1 illustrates a schematic view of a computing system according to an example of the present disclosure.

Referring to FIG. 1, an embodiment of a computing system 10 is depicted, comprising, by way of non-limiting example, a processor 12, and a memory 14 storing executable instructions 16 that, in response to execution by the processor 12, cause the processor 12 to execute a neural network model trainer 18, an impending fault simulator 30, and a health status evaluator 42.

The neural network model trainer 18 is configured to train one or more untrained physics-informed neural network (PINN) models 26 to learn the lift coefficients of an airfoil using training input data 20 comprising a collection of geometric features and physics-based features of the airfoil, such as angles of attack, Reynolds numbers, approximate lift coefficients, and approximate pressure drag coefficients. The training input data 20 also includes corresponding true lift coefficients as labels. The neural network model trainer 18 randomly initializes weights and biases 22 of the one or more PINN models 26, so as to apply a unique configuration of weights and biases 22 to each of the one or more PINN models 26. The training functions 24 of the model trainer 18 use the training input data 20 and randomly initialized weights and biases 22 to train the one or more untrained PINN models 26 and generate one or more trained PINN models 28. The geometric features of the airfoils can be represented in the training input data 20 as two-dimensional plots in xy-coordinates.

The impending fault simulator 30 is configured to receive input of a nominal airfoil geometry 32 of an airfoil, and simulate impending faults by perturbing the nominal airfoil geometry 32 using a prescribed airfoil deformer 34 to generate perturbed airfoil geometries 36. The impending fault simulator 30 uses the perturbed airfoil geometries 36 as an input to the one or more trained PINN models 28 to generate respective predicted airfoil lift coefficients 38 for the perturbed airfoil geometries 36, which are stored in an airfoil lift coefficient database 40. The nominal airfoil geometry 32 can be provided from a publicly available airfoil coordinates database, for example.

The prescribed airfoil deformer 34 generates the various perturbed airfoil geometries 36 by sweeping through a range of perturbations, using prescribed failure mechanisms to perturb the nominal airfoil geometry 32 into perturbed airfoil geometries 36. These prescribed failure mechanisms can include a random surface deformation mechanism, a leading-edge surface erosion mechanism, a leading-edge surface corrosion mechanism, a trailing-edge surface erosion mechanism, a trailing-edge surface corrosion mechanism, or a combination thereof.

By inputting the perturbed airfoil geometries 36 into the one or more trained PINN models 28, impending failure or prediction values can be simulated. When the predicted airfoil lift coefficients 38 are correlated with specific perturbed airfoil geometries 36, airfoil nominal-to-deformation transitions can be identified in terms of aerodynamic forces. Accordingly, the uncertainty regions of the predicted airfoil lift coefficients 38 can be quantified under different operational dimensions, thereby facilitating proactive fault detection and system maintenance. The different operational dimensions can be differing angles of attack or different perturbation scales of the perturbed airfoil geometry, for example.

The health status evaluator 42 is configured to receive input of the airfoil lift coefficient database 40 correlating various perturbed airfoil geometries 36 with respective predicted airfoil lift coefficients 38, and generate a predicted health status 50 for the airfoil for each of a plurality of mission-specific requirements 44 under both nominal and fault probing conditions, based on the predicted airfoil lift coefficients 38 for the perturbed airfoil geometries 36, thereby leveraging physics-informed machine learning for efficiently generating airfoil prognostics.

Nominal conditions can correspond to normal use-and-wear operations, while fault probing conditions can correspond to extreme operating conditions. Given a mission-specific requirement 44, an extreme operation condition identifier 46 uses a fault probing strategy to search for plausible fault probing conditions, or operating conditions outside of the mission-specific requirement 44. The extreme operation condition identifier 46 can use a fault mechanism database to identify potential issues (dynamic stalls, for example) per mission-specific requirement 44. Such plausible operation conditions (an angle of attack bound outside of the mission requirement 44, for example) are then used by the health status estimator 48 to simulate impending faults and generate a predicted health status 50 for the airfoil for each mission-specific requirement 44. The extreme operation condition identifier 46 can also synthesize such simulations of impending faults to control for biases and variance.

Treatment-response matching in historical data with proper extrapolation can be performed to control for biases and variance. For example, relationships between independent variables and dependent variables can be established in a historical data set. The independent variables are the predicted airfoil lift coefficients 38 and perturbed airfoil geometries 36, while the dependent variables are predicted health status 50 for the airfoil. A statistical or machine learning technique can be applied to identify relationships or patterns between the independent variables and the dependent variables. These identified relationships or patterns can then be extrapolated to predict the future health status of an airfoil with geometric features and lift coefficients that are not present in the historical data set.

The predicted health status 50 for the airfoil can include a remaining useful life (RUL) **50*a* and health status (HS) 50*b* of the airfoil for each mission under both nominal and fault probing conditions with confidence bounds. The RUL 50*a* can be expressed as numbers of mission segments over time. The HS 50*b* can be issued in the form of one of a plurality of health status categories (warning, caution, advisory, and nominal, for example). Accordingly, the dynamics and health status of the airfoil under fault probing conditions can be simulated to generate a comprehensive predicted health status 50** of the airfoil with confidence bounds for a given mission.

For the purposes of the present disclosure, an 'airfoil' is defined as a structure designed to manipulate the flow of air, and other gases in certain cases, around an object in order to generate a force. The most common application of an airfoil is in the design and manufacture of aircraft wings, where the shape of the airfoil allows the aircraft to generate lift, thus enabling flight. However, airfoils are not limited to aircraft and can be found in other applications such as wind turbines and fans. The specific shape and characteristics of an airfoil can vary depending on the application, with factors such as the intended speed, size of the aircraft, and overall mission requirements influencing the design.

For the purposes of the present disclosure, an 'aircraft' is defined as any machine or device capable of atmospheric flight. This includes, but is not limited to, airplanes, helicopters, unmanned aerial vehicles (UAVs, often referred to as drones), airships, gliders, autogyros, hovercraft, and spacecraft within the atmosphere.

For the purposes of the present disclosure, 'lift' refers to the aerodynamic force that opposes the force of gravity and enables an airfoil to achieve and maintain flight. This force is typically generated by the flow of air over the surface of the airfoil. The lift is primarily dependent on the geometric shape of the airfoil as well as physics-based features including the angle of attack, the speed at which the airfoil is moving relative to the air around it, and the density of the air. The lift is usually quantified in terms of the lift coefficient, which is a dimensionless number that facilitates comparisons and calculations involving different airfoil shapes and operating conditions.

Figure 2:
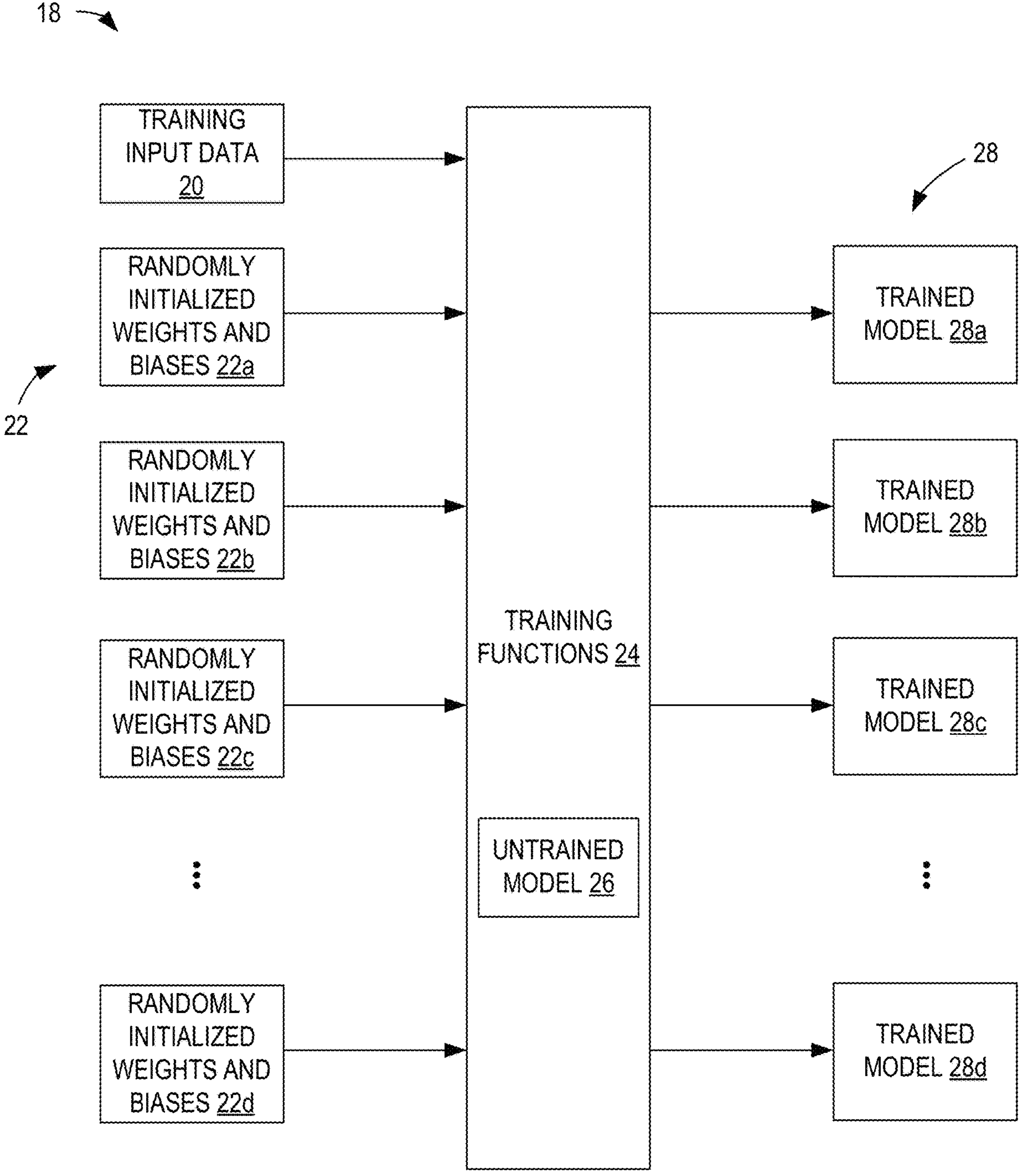
FIG. 2 illustrates a schematic depiction of the generation of a plurality of trained models using the training functions of the computing system of FIG. 1.

Turning to FIG. 2, one example of the operations of the training functions 24 of the neural network model trainer 18 of FIG. 1 is schematically depicted. The initialized weights and biases 22 can be randomized repeatedly to generate a plurality of randomized initialized weights and biases **22*a*, 22*b*, 22*c*, 22*d* which are used to train an untrained PINN model 26 using the training input data 20 and the training functions 24 to generate a plurality of different trained PINN models 28*a*, 28*b*, 28*c*, 28*d* respectively, each trained PINN model 28 having a unique configuration of weights and biases 22. The training functions 24 can use a backpropagation algorithm to update or adjust the weights and biases 22*a-d* of the one or more PINN models 28 based on a comparison between the predicted airfoil lift coefficients outputted by the one or more PINN models 28 and the labels in the training input data 20. The training functions 24 can include a loss function to measure the error between the predicted airfoil lift coefficients outputted by the one or more PINN models 28 and the labels in the training input data 20, so that the measured error can be minimized with each iteration of the backpropagation algorithm. This iterative process of updating or adjusting the weights and biases 22***a-d* can continue until the output of predicted airfoil lift coefficients outputted by the one or more PINN models 28 converge with the labels in the training input data 20, signifying convergence, or the minimization of the loss function.

The adjusted weights and biases 22*a-d*, each representing a unique configuration of weights and biases, are applied to a plurality of instantiations of the untrained PINN model 26, thereby creating a plurality of trained PINN models 28*a-d* with the updated weights and biases 22*a-d*. In this manner, the neural network model trainer 18 can create a plurality of trained PINN models 28*a-d*, each with different weights and biases 22*a-d*, which can be used to generate a range of predictions of the airfoil lift coefficients for various perturbed airfoil geometries. Although four sets of weights and biases 22*a-d* and four trained PINN models 28*a-d* are depicted in FIG. 2, the quantities of sets of weights and biases 22*a-d* and trained PINN models 28*a-d* are not particularly limited, and can be one or more.

Figure 3:
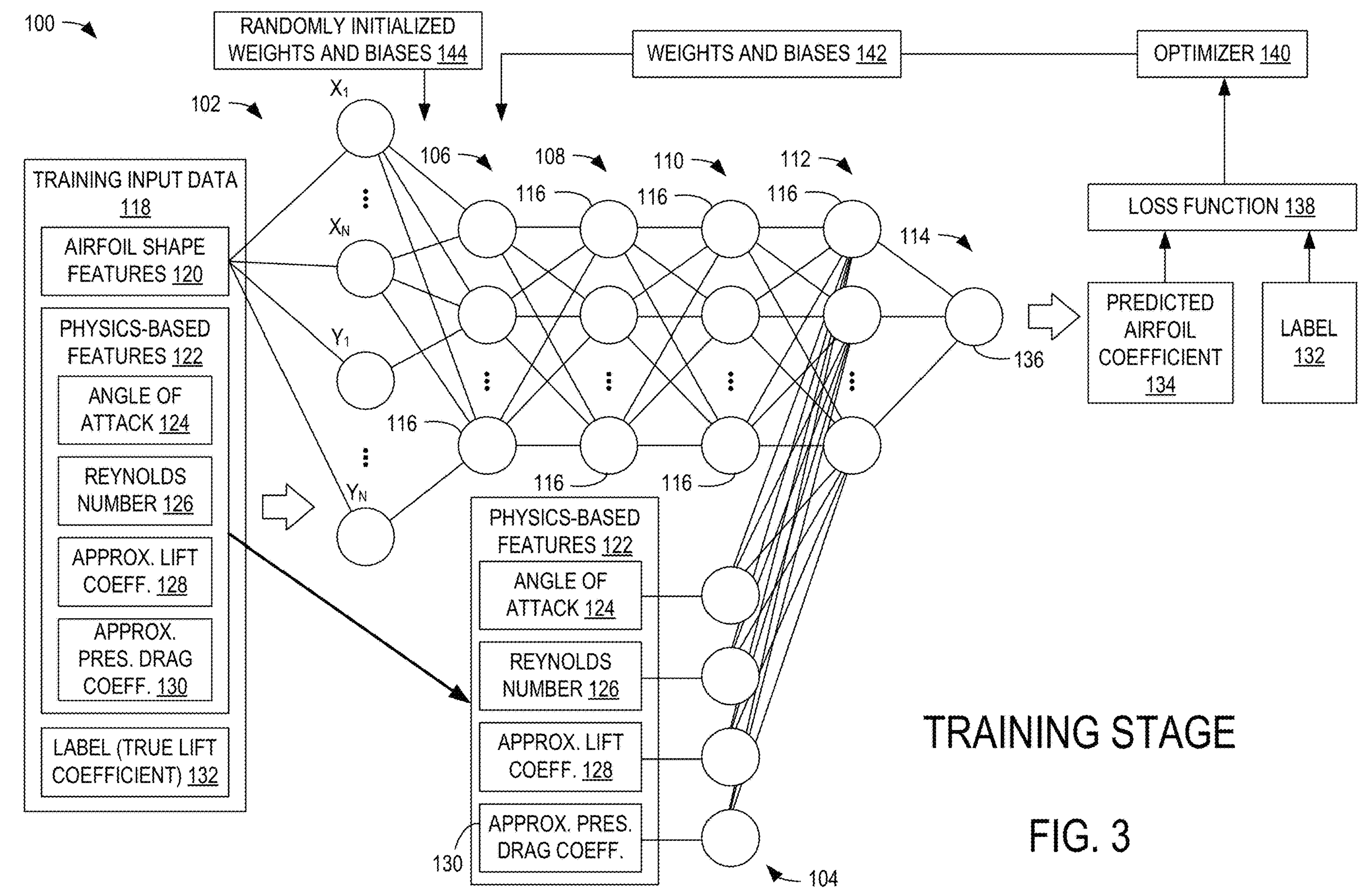
FIG. 3 illustrates a schematic view of the model trainer of FIG. 1 training an untrained model in the training stage.

FIG. 3 shows an example of a fully connected physics-informed neural network 100 as an airfoil lift coefficient prediction model which is trained using training input data 118. The physics-informed neural network 100 comprises an input layer 102, four fully connected hidden layers 106, 108, 110, 112, and an output layer 114. The hidden layers 106, 108, 110, 112 each comprise neurons 116, which are not shown in FIG. 3 for simplicity. The physics-informed neural network 100 is an example of the untrained PINN model 26 of FIG. 1.

The physics-informed neural network 100 receives, as input, training input data 118 including airfoil geometric features 120, physics-based features 122, and labels 132. The physics-based features 122 can include angles of attack 124, Reynolds numbers 126, approximate lift coefficients 128, and approximate pressure drag coefficients 130. The labels 132 are the true lift coefficients that are used for training purposes.

The approximate lift coefficients 128 and approximate pressure drag coefficients 130 can be simulated with efficient physics-based methods, such as panel methods. Airflow around airfoils can be simulated using panel methods by dividing the airfoil into small, flat panels, performing velocity and pressure calculations for each panel, and then using the calculated pressure and velocity information to simulate lift and drag forces over the airfoil. Such simulations can be combined with other techniques, such as boundary layer analysis for viscous effects, or computational fluid dynamics (CFD) simulations to increase the accuracy of the simulations. The labels 132 for the true lift coefficients can be provided from physics experiments, flight tests, wind tunnel experiments, or high-fidelity simulators, for example. The physics-informed neural network 100 is configured to receive the nominal geometry of physical objects at the input layer 102. In the example of FIG. 2, the input layer 102 is configured to receive airfoil geometric features 120 as airfoil xy-coordinates, which can represent vectors of current and historical spatial sensor readings of airfoil geometry.

The physics-based features 122 are concatenated at an intermediate layer 104 along with the latent variables at the intermediate layer 104. The nodes of the intermediate layer 104 include a node for the angle of attack 124, a node for the Reynolds number 126, a node for the approximate lift coefficient 128, and a node for the approximate pressure drag coefficient 130. In response, the output layer 114 is configured to output a predicted airfoil lift coefficient 134 based on the inputted airfoil geometric features 120 and the airfoil physics-based features 122. The output layer 114 comprises a single output neuron 136. In some examples, the output neuron 136 comprises a sigmoidal function. In other examples, the output neuron 136 comprises any other suitable type of function.

The initial weights and biases 144 for each neuron 116 are randomized before the beginning of training. The weights and biases 142 of each neuron 116 are learned by solving the regression problem, calculating the loss function 138 as the mean squared error between the labels (true lift coefficients) 132 and predicted airfoil lift coefficients 134. Based on the calculated loss function 138, the weights and biases 142 in the physics-informed neural network 100 are updated by an optimizer 140 until convergence, or the minimization of the loss function 138. The trained physics-informed neural network 100 is then used to make predictions of airfoil lift coefficients 134 of airfoils that are not in the training input data 118, by using the airfoil geometric features 120 and physics-based features 122 of the airfoils.

In some examples, the physics-informed neural network 100 comprises a recurrent neural network. In other examples, the physics-informed neural network 100 can be any other suitable type of machine learning (ML) model, such as a convolutional neural network model.

Figure 4:
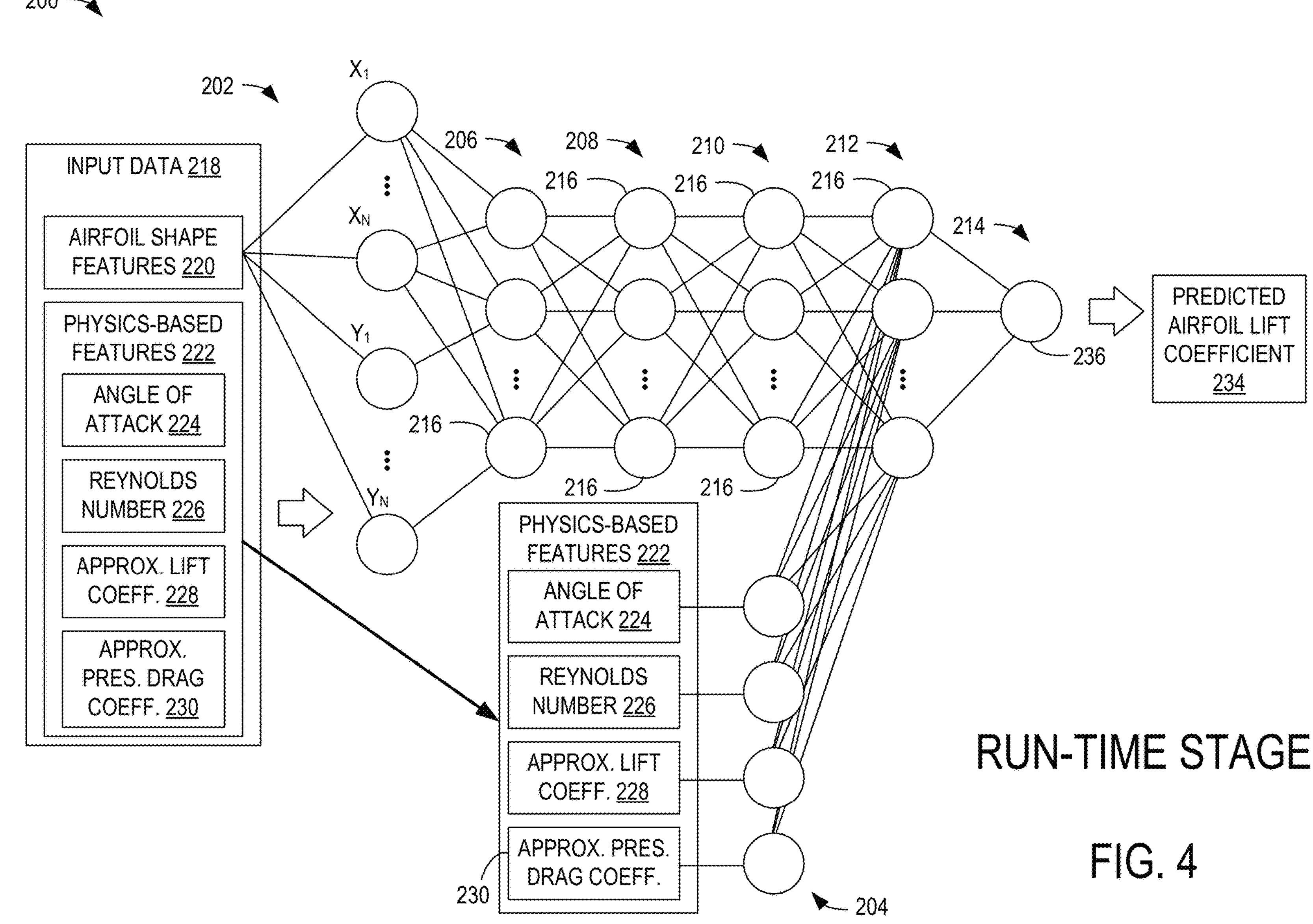
FIG. 4 illustrates a schematic view of one of the trained models of FIG. 1 generating predicted airfoil lift coefficients based on inputted airfoil geometric features and physics-based features.

FIG. 4 shows a run-time example of a fully trained physics-informed neural network 200 as an airfoil lift coefficient prediction model which has been trained using the training input data 118 of FIG. 3. The physics-informed neural network 200 comprises an input layer 202, four fully connected hidden layers 206, 208, 210, 212, and an output layer 214. The hidden layers 206, 208, 210, 212 each comprise neurons 216, which are not shown in FIG. 4 for simplicity. The physics-informed neural network 200 is an example of the one or more trained PINN models 28 of FIGS. 1 and 2. The physics-informed neural network 200 receives input data 218 including geometric features 220 and physics-based features 222 of a perturbed airfoil or an unknown airfoil. The physics-based features 222 can include angles of attack 224, Reynolds numbers 226, approximate lift coefficients 228, and approximate pressure drag coefficients 230. The physics-based features 222 are concatenated at an intermediate layer 204 along with the latent variables at the intermediate layer 204. In response, the output neuron 236 at the output layer 214 is configured to output a predicted airfoil lift coefficient 234 based on the inputted airfoil geometric features 220 and airfoil physics-based features 222.

Figure 5:
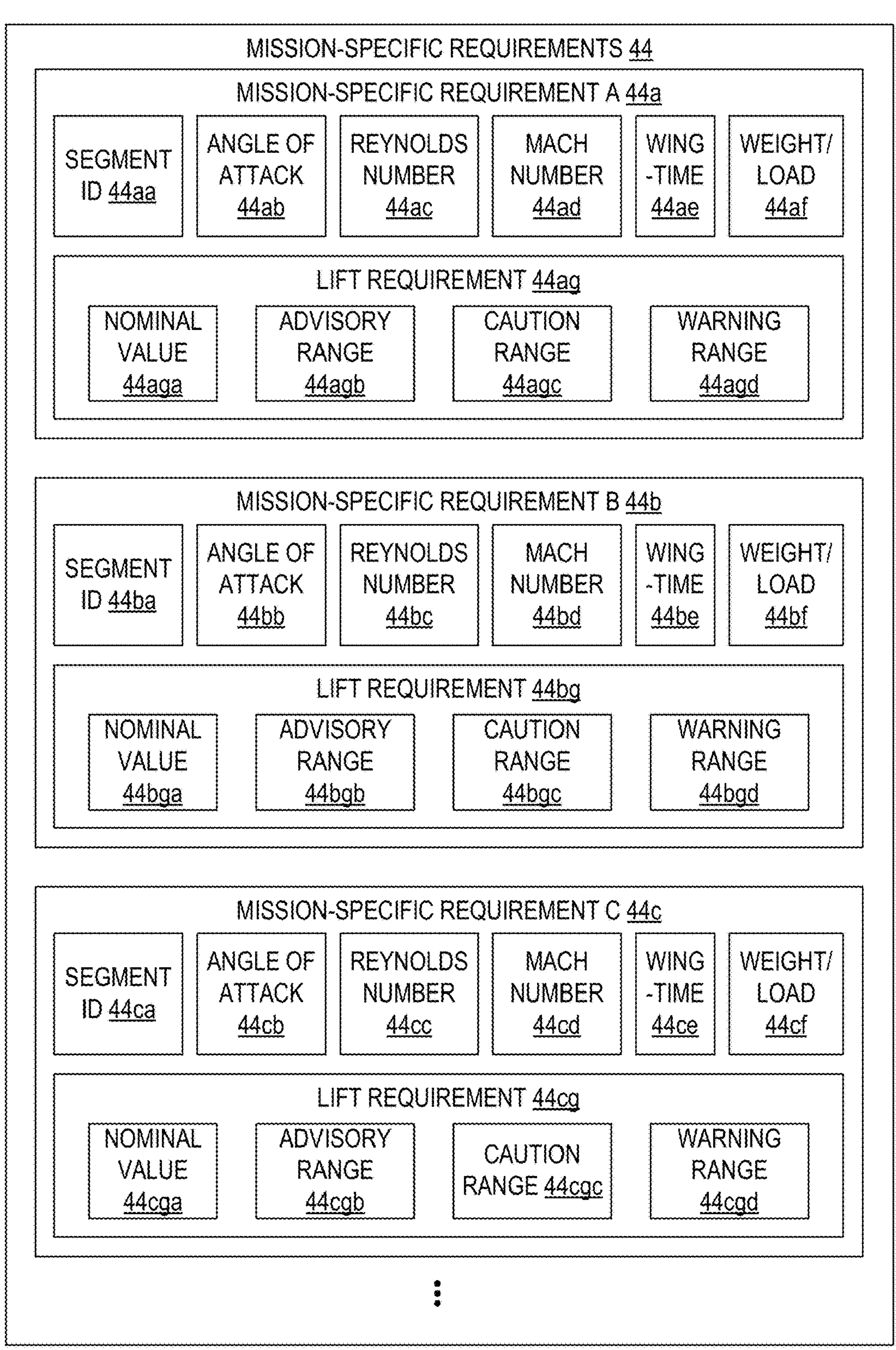
FIG. 5 illustrates a schematic example of the mission-specific requirements of the computing system of FIG. 1.

FIG. 5 presents a schematic representation of an exemplary set of mission-specific requirements 44. These mission-specific requirements 44 are configured to be inputted into the extreme operation condition identifier 46 of FIG. 1. Through these mission-specific requirements 44, the health status evaluator 42 can search for and identify plausible fault probing conditions in a variety of aircraft with differing configurations and operational specifications.

The mission-specific requirements 44 are configured to account for the variations that exist across different aircraft models and their respective unique application environments. As such, each set of mission-specific requirements 44 reflects specific operating characteristics and constraints that are inherent to a particular type of aircraft.

As an illustration, a first set of mission-specific requirements 44*a* is configured for commercial airliners. These requirements 44*a* encompass several parameters, including a segment ID 44*aa*, an angle of attack 44*ab*, a Reynolds number 44*ac*, a Mach number 44*ad*, wing-time 44*ae*, weight or load-bearing capacity 44*af*, and a lift requirement 44*ag*.

The lift requirement 44*ag* can indicate the minimum aerodynamic lift that the aircraft needs to maintain for safe operation. The lift requirement 44*ag* includes several sub-components, namely a nominal value 44*aga*, an advisory range 44*agb*, a caution range 44*agc*, and a warning range 44*agd*. Configured for commercial airliners, the lift requirement 44*ag* indicates the need for high lift generation even at lower speeds, a significant aspect during phases such as takeoff and landing.

Similarly, the second mission-specific requirement 44*b*, configured for supersonic aircraft, comprises a segment ID 44*ba*, an angle of attack 44*bb*, a Reynolds number 44*bc*, a Mach number 44*bd*, wing-time 44*be*, weight or load-bearing capacity 44*bf*, and a lift requirement 44*bg*. The lift requirement 44*bg* also includes a nominal value 44*bga*, an advisory range 44*bgb*, a caution range 44*bgc*, and a warning range 44*bgd*. Configured for supersonic aircraft, the lift requirement 44*bg* can indicate the need for moderate lift generation at low speeds, which concurrently minimizes aerodynamic drag at high speeds, a characteristic vital for supersonic travel.

Lastly, the third mission-specific requirement 44*c*, configured for cargo aircraft, comprises a segment ID 44*ca*, an angle of attack 44*cb*, a Reynolds number 44*cc*, a Mach number 44*cd*, wing-time 44*ce*, weight or load-bearing capacity 44*cf*, and a lift requirement 44*cg*. The lift requirement 44*cg* also includes a nominal value 44*cga*, an advisory range 44*cgb*, a caution range 44*cgc*, and a warning range 44*cgd*. Notably, in cargo aircraft, the lift requirement 44*cg* emphasizes high lift generation at low speeds. Furthermore, the weight or load-bearing capacity 44*cf* specifies a high structural strength of the airfoil, a requirement that ensures the ability of the airfoil to support heavy payloads, a common scenario in cargo aircraft operations. It will be noted that, although three mission-specific requirements 44*a-c* are depicted here, the quantity of mission-specific requirements 44 is not particularly limited, and can be more than three.

Figure 6A:
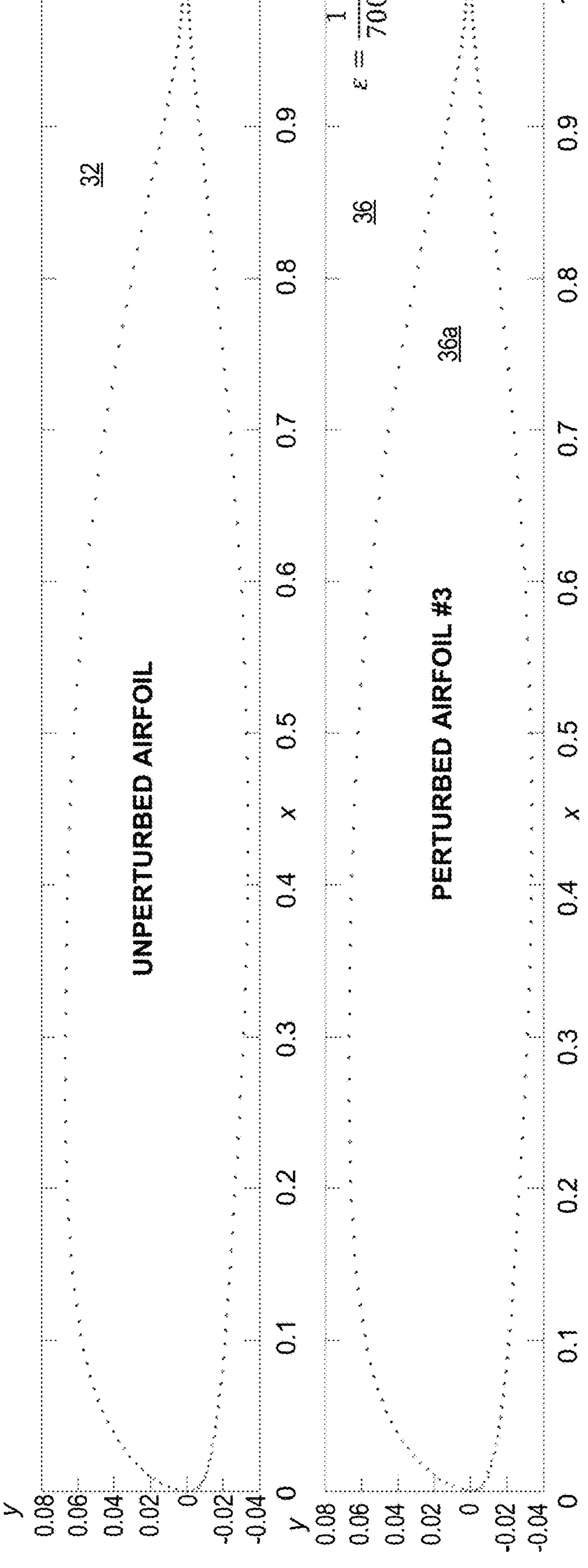
FIGS. 6A and 6B illustrate representative depictions of the nominal airfoil geometry and three distinct variations of the perturbed airfoil geometries of FIG. 1.
Figure 6B:
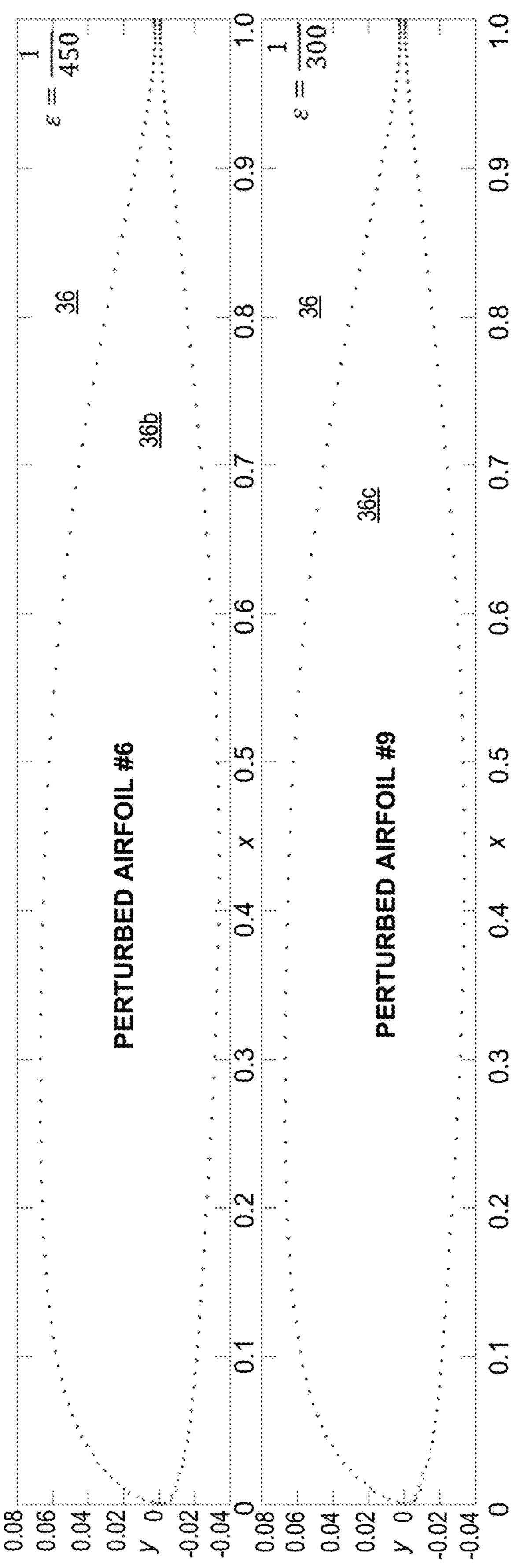

As shown in FIG. 6A, the third perturbed airfoil geometry 36*a* is generated at a perturbation scale of epsilon $(\varepsilon)=1/700$. As shown in FIG. 6B, the sixth perturbed airfoil geometry 36*b* is generated at a perturbation scale of epsilon $(\varepsilon)=1/450$, and the ninth perturbed airfoil geometry 36*c* is generated at a perturbation scale of epsilon $(\varepsilon)=1/300$. Note that other methods to simulate airfoil shape degradation can replace the examples here.

FIGS. 6A and 6B illustrate representative depictions of the nominal airfoil geometry 32 and three distinct variations of the perturbed airfoil geometries 36 of FIG. 1. These perturbations are expressed as modifications to the xy-coordinates of the airfoil, with respect to the Cartesian coordinate system. The leftmost end of each perturbed airfoil geometry 36 exhibits small markers or dots, representing the leading-edge points that have undergone perturbation.

The degree of perturbation, or deformation, is denoted by the variable epsilon (ε), which serves as an index of the perturbation scale, indicating the extent to which the original airfoil geometry has been altered. The term 'perturbation' within this context is defined as an intentional deviation from the normal or standard airfoil shape, typically introduced for the purpose of simulating effects of various adverse conditions or failures on the airfoil structure.

The formation of these perturbed airfoil geometries 36*a-c* involves an array of systematic perturbations executed by successively applying an array of pre-determined failure mechanisms. These mechanisms can include a random surface deformation mechanism, a leading-edge surface erosion mechanism, a leading-edge surface corrosion mechanism, a trailing-edge surface erosion mechanism, a trailing-edge surface corrosion mechanism, or a combination thereof. Through these transformations, the nominal airfoil geometry 32 is methodically morphed into the range of perturbed airfoil geometries 36.

For example, the airfoil leading-edge can be perturbed using the following leading-edge surface corrosion mechanism. First, the points of the upper and lower surfaces of the leading-edge of the airfoil geometry are perturbed. Secondly, a randomly generated Δy is subtracted from the magnitude of each y coordinate using the formula $y=y-\Delta y*\mathrm{sign}(y)$, where sign ( ) is a sign function. Thirdly, the scale of delta y is scaled to tune the amount of perturbation using the formula $y=y-\varepsilon*\Delta y*\mathrm{sign}(y)$. The first, second, and third steps are repeated for different perturbation scales at different epsilon (ε) values, which can include 1/900, 1/800, 1/700, 1/600, 1/500, 1/450, 1/400, 1/350, and 1/300, for example.

FIG. 6A specifically exhibits the third perturbed airfoil geometry 36*a*, which has been generated using a perturbation scale defined by epsilon $(\varepsilon)=1/700$. This indicates that the perturbation has been performed at a relatively fine scale, implying minute adjustments to the standard, nominal airfoil geometry.

Turning to FIG. 6B, two additional perturbed airfoil geometries 36*b*, 36*c* are illustrated, respectively. Here, the sixth perturbed airfoil geometry 36*b* has been generated at a perturbation scale of epsilon $(\varepsilon)=1/450$, while the ninth perturbed airfoil geometry 36*c* at a perturbation scale of epsilon $(\varepsilon)=1/300$. These values signify larger scale perturbations, indicating more substantial deformations of the airfoil geometry.

It should be noted that while this disclosure provides certain specific techniques for simulating airfoil shape degradation, the principles outlined are not limited to these examples. Alternative methodologies capable of generating similar simulations of airfoil shape perturbation or deterioration are within the scope of this invention and could be employed in lieu of, or in conjunction with, the methods described here.

Figure 7:
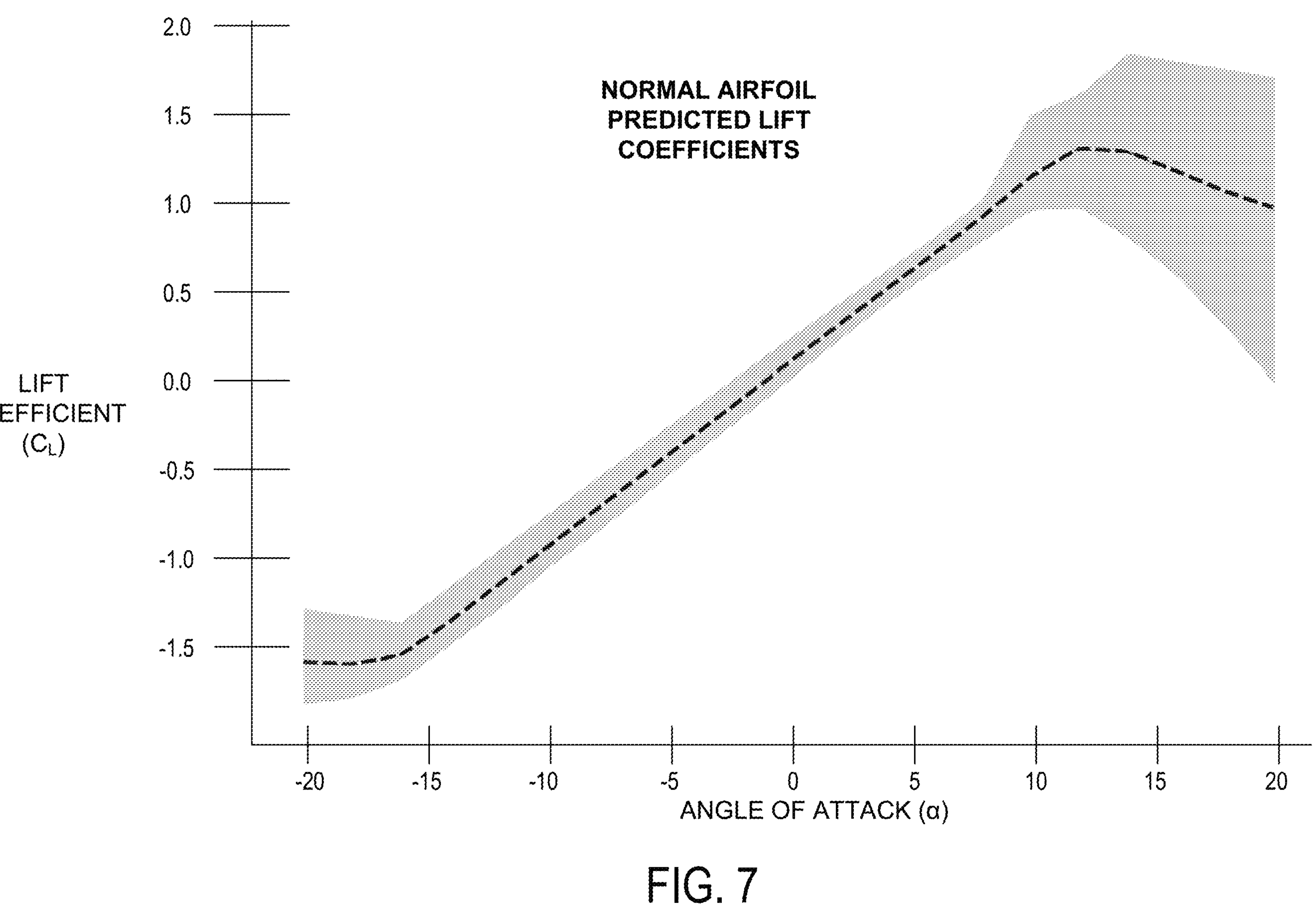
FIG. 7 illustrates an example of the predicted airfoil lift coefficients that are generated by the trained models of FIG. 1 or the trained physics-informed neural network of FIG. 4 for nominal airfoil geometry.

FIG. 7 illustrates an example of the predicted airfoil lift coefficients 38 that are generated by the one or more trained PINN models 28 of FIG. 1 or the trained physics-informed neural network 200 of FIG. 4 for nominal airfoil geometry. The predicted airfoil lift coefficients 38 are plotted against various angles of attack. The gray region is an uncertainty region indicating ranges of between the minimum and maximum predicted airfoil lift coefficients 38, and the black dashed line is the mean of the predicted values.

Figure 8A:
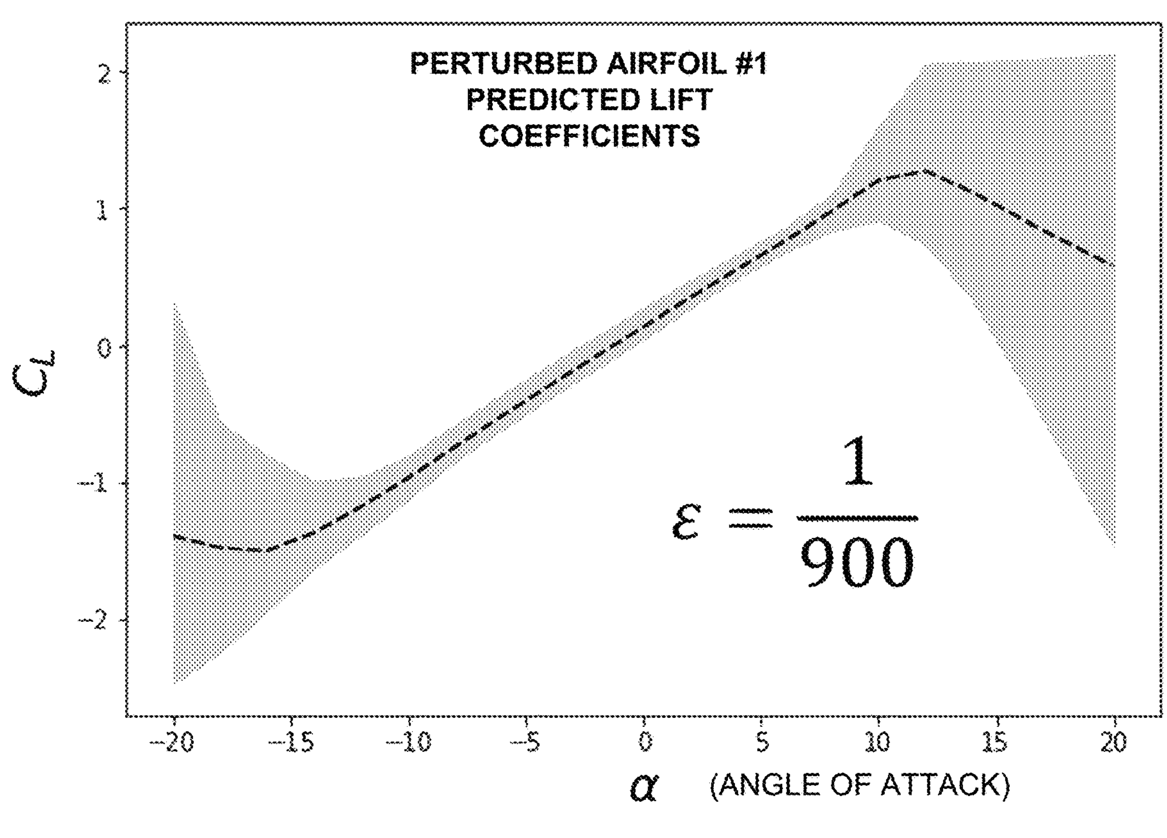
FIGS. 8A-I illustrate examples of the predicted airfoil lift coefficients that can be generated by the trained models of FIG. 1 or the trained physics-informed neural network of FIG. 4 for various perturbed airfoil geometry.
Figure 8B:
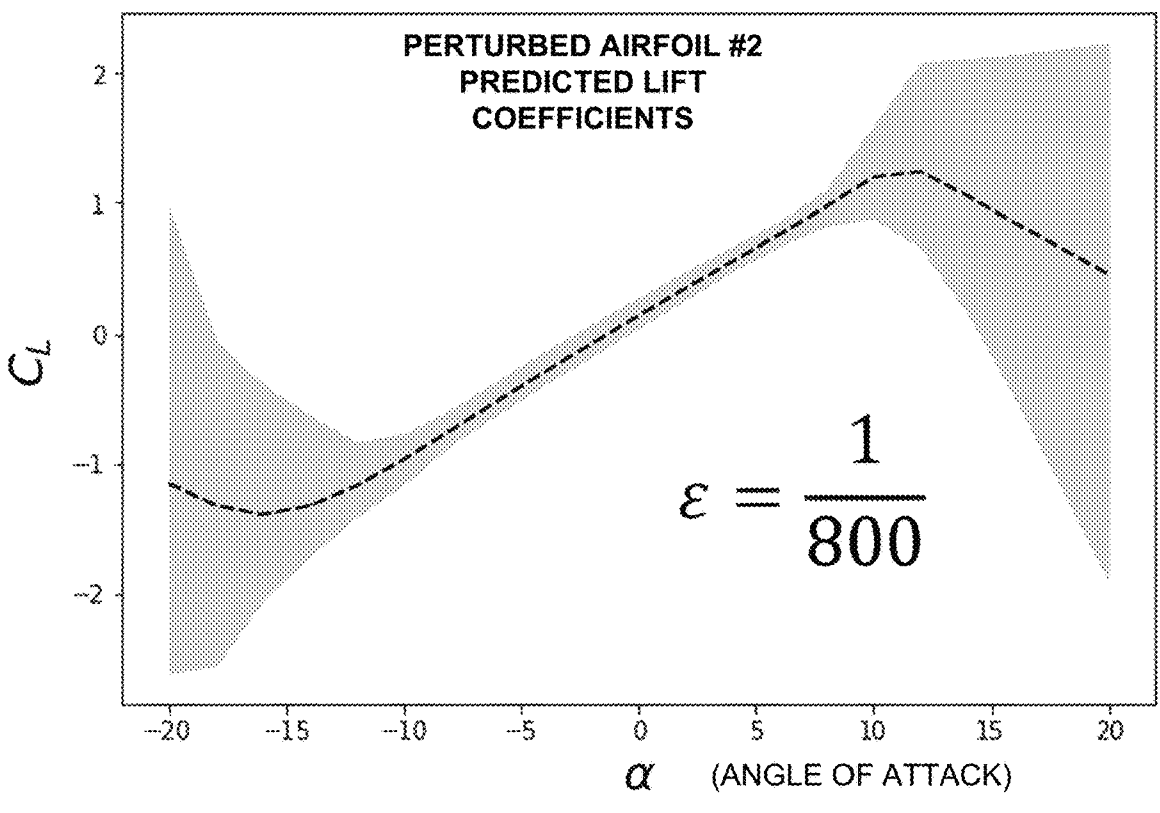
Figure 8C:
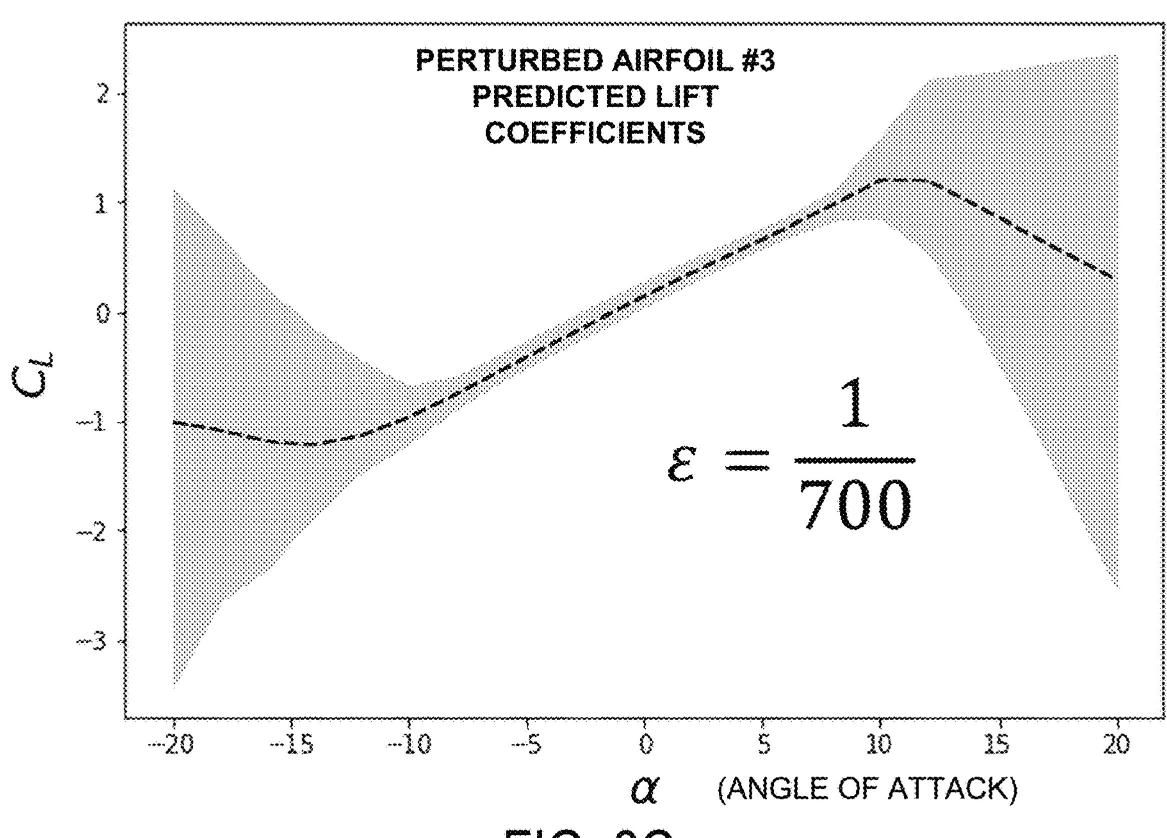
Figure 8D:
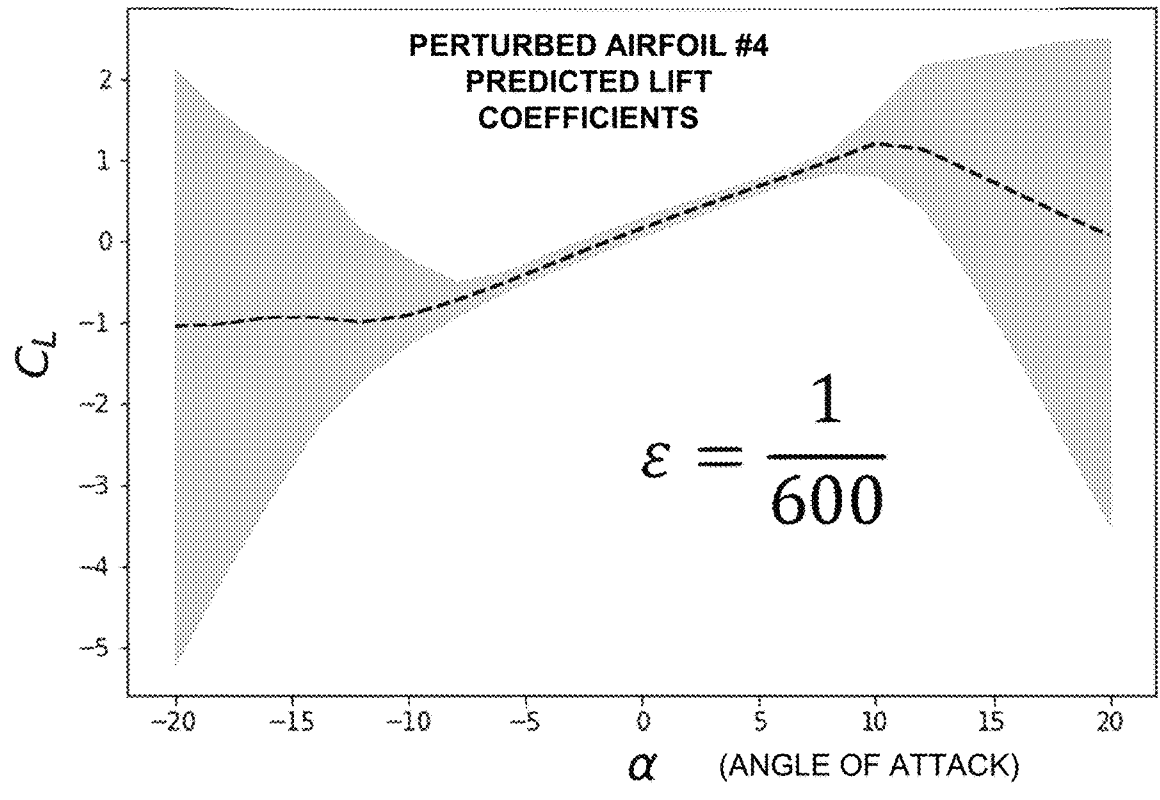
Figure 8E:
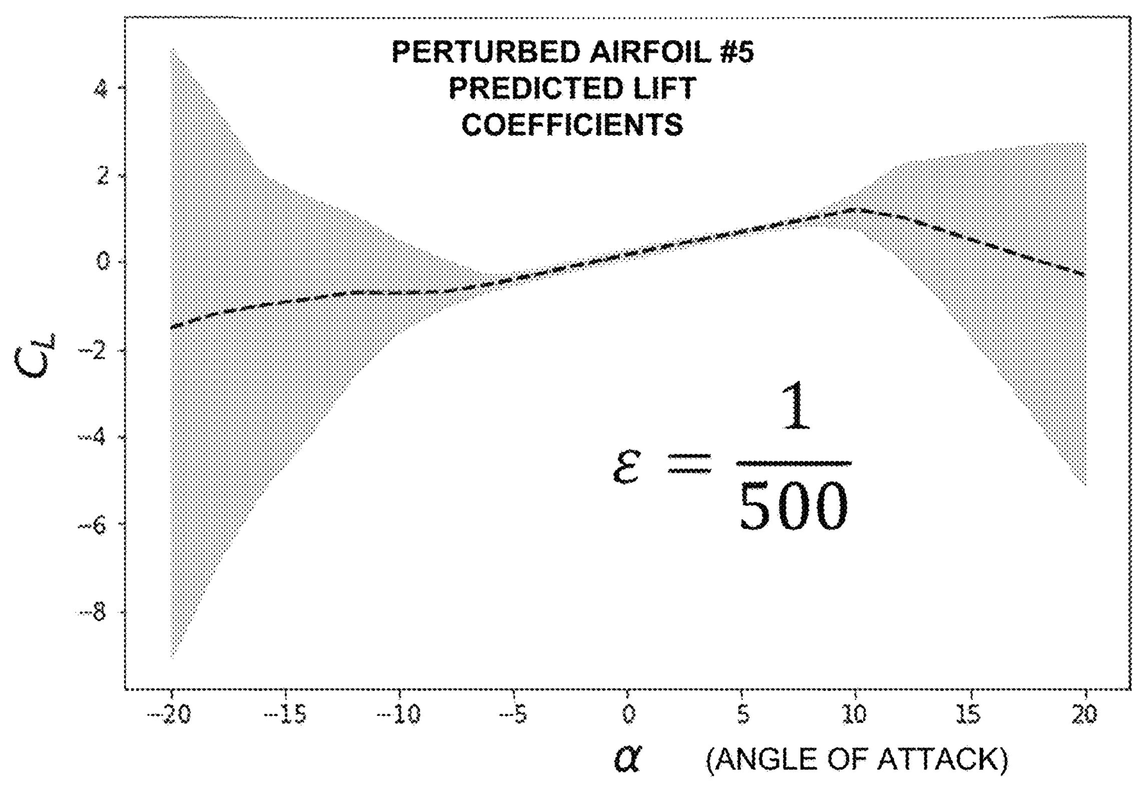
Figure 8F:
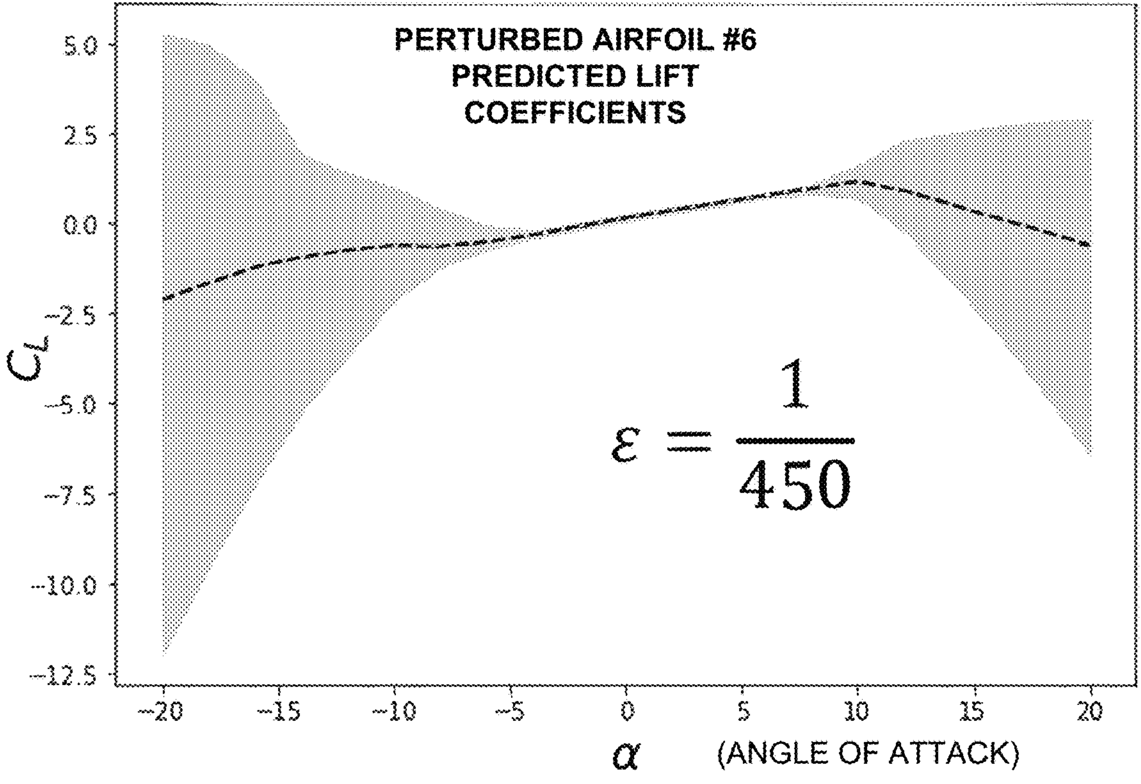
Figures 8G, 8H:
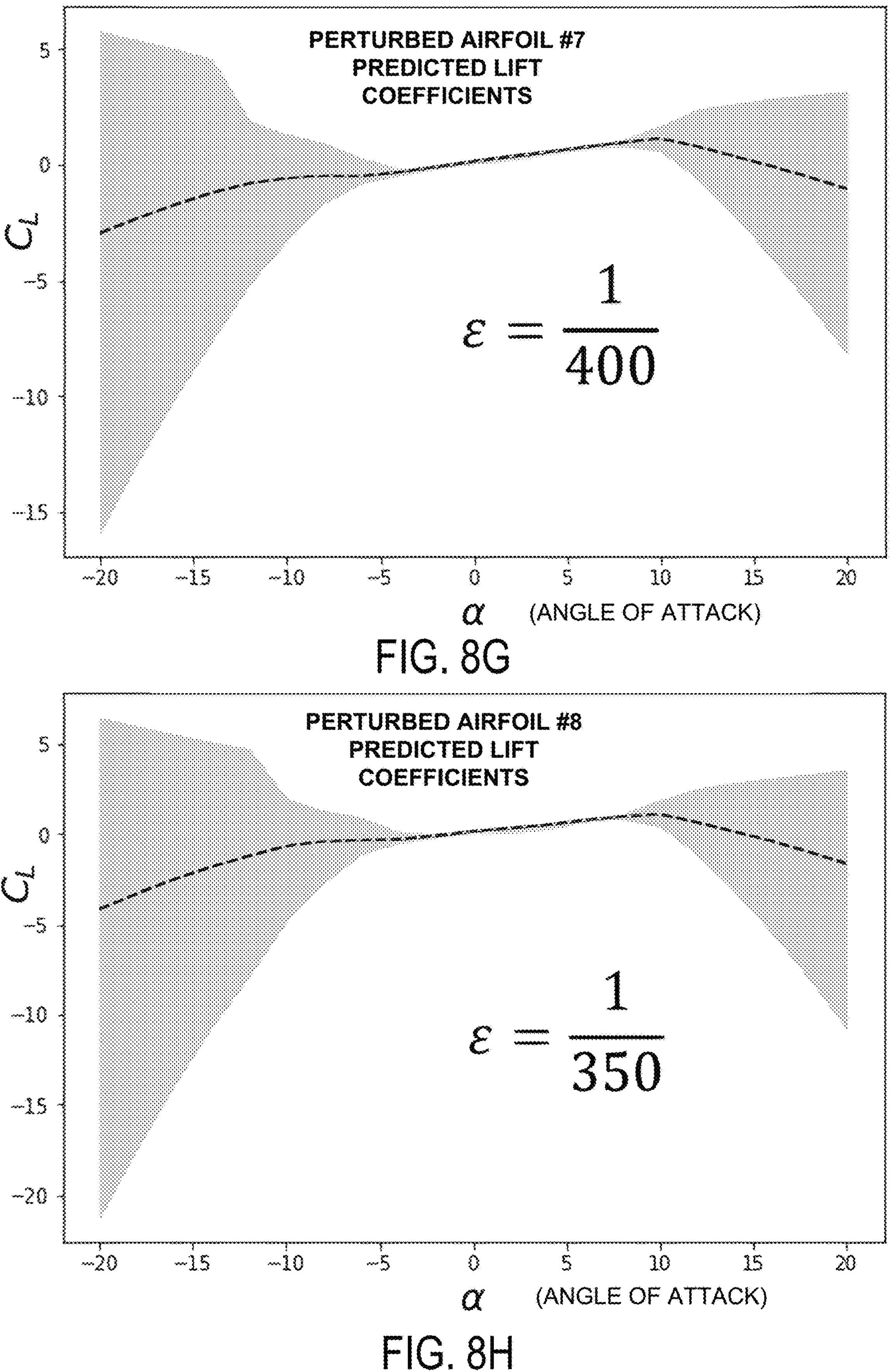
Figure 8I:
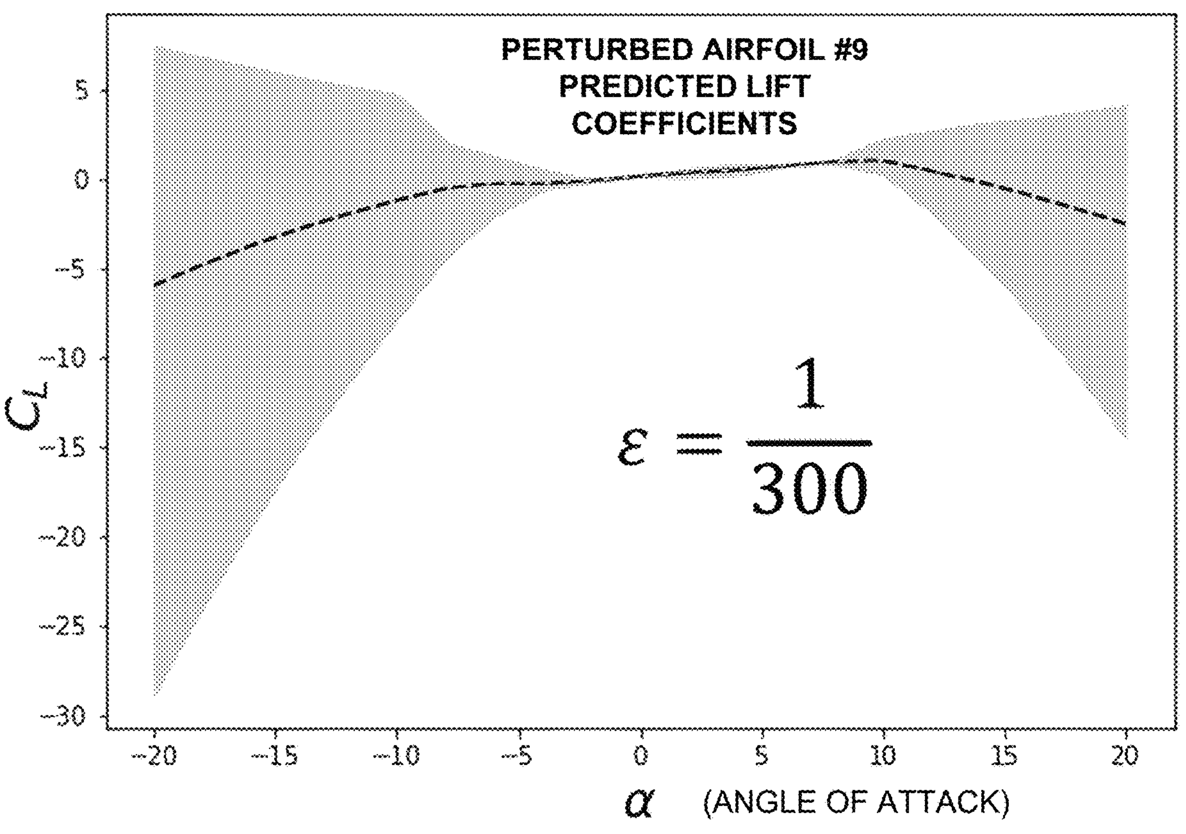

FIGS. 8A-I illustrate examples of the predicted airfoil lift coefficients 38 that can be generated by the one or more trained PINN models 28 of FIG. 1 or the trained physics-informed neural network 200 of FIG. 4 for various perturbed airfoil geometry. FIG. 8A shows an example of the predicted airfoil lift coefficients 38 plotted against various angles of attack for a first perturbed airfoil geometry that has been generated at a perturbation scale of epsilon $(\varepsilon)=1/950$. FIG. 8B shows an example of the predicted airfoil lift coefficients 38 plotted against various angles of attack for a second perturbed airfoil geometry that has been generated at a perturbation scale of epsilon $(\varepsilon)=1/800$. FIG. 8C shows an example of the predicted airfoil lift coefficients 38 plotted against various angles of attack for a third perturbed airfoil geometry that has been generated at a perturbation scale of epsilon (ε)=1/700. FIG. 8D shows an example of the predicted airfoil lift coefficients 38 plotted against various angles of attack for a fourth perturbed airfoil geometry that has been generated at a perturbation scale of epsilon (ε)=1/600. FIG. 8E shows an example of the predicted airfoil lift coefficients 38 plotted against various angles of attack for a fifth perturbed airfoil geometry that has been generated at a perturbation scale of epsilon (ε)=1/500. FIG. 8F shows an example of the predicted airfoil lift coefficients 38 plotted against various angles of attack for a sixth perturbed airfoil geometry that has been generated at a perturbation scale of epsilon (ε)=1/450. FIG. 8G shows an example of the predicted airfoil lift coefficients 38 plotted against various angles of attack for a seventh perturbed airfoil geometry that has been generated at a perturbation scale of epsilon (ε)=1/400. FIG. 8H shows an example of the predicted airfoil lift coefficients 38 plotted against various angles of attack for a eighth perturbed airfoil geometry that has been generated at a perturbation scale of epsilon (ε)=1/350. FIG. 8I shows an example of the predicted airfoil lift coefficients 38 plotted against various angles of attack for a ninth perturbed airfoil geometry that has been generated at a perturbation scale of epsilon (ε)=1/300.

FIGS. 9A-E illustrate additional examples of predicted airfoil lift coefficients 38 that can be generated by the one or more trained PINN models 28 of FIG. 1 or the trained physics-informed neural network 200 of FIG. 4 for various perturbed airfoil geometry and angles of attack. In the examples of FIGS. 9A-E, the predicted airfoil lift coefficients 38 plotted against various scales of perturbation for given angles of attack assuming a Reynolds number of 1,000,000. The gray region is an uncertainty region indicating ranges of between the minimum and maximum predicted airfoil lift coefficients 38, and the black dashed line is the mean of the predicted values. It will be noted that, the uncertainty bound often increases in tandem with increases in the perturbation scale, possibly indicating unstable and unpredictable aerodynamic forces.

Figure 9A:
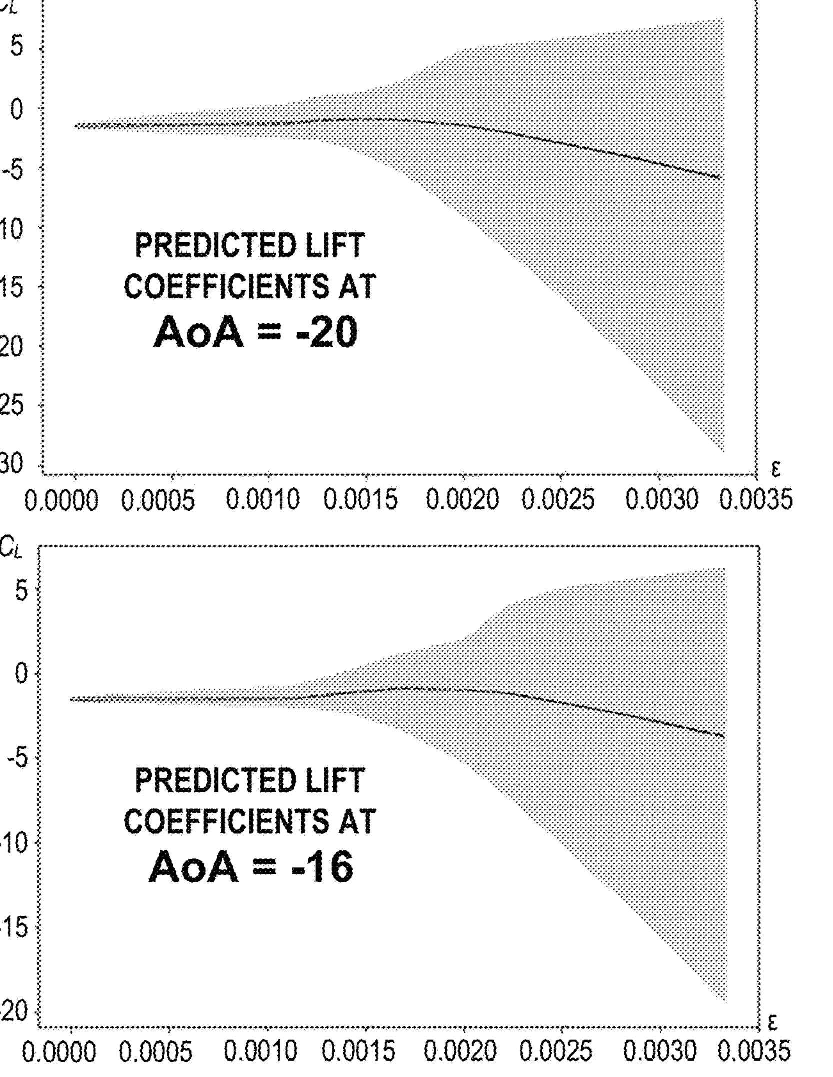
FIGS. 9A-E illustrate additional examples of predicted airfoil lift coefficients that can be generated by the trained models of FIG. 1 or the trained physics-informed neural network of FIG. 4 for various perturbed airfoil geometry and angles of attack.
Figure 9A:
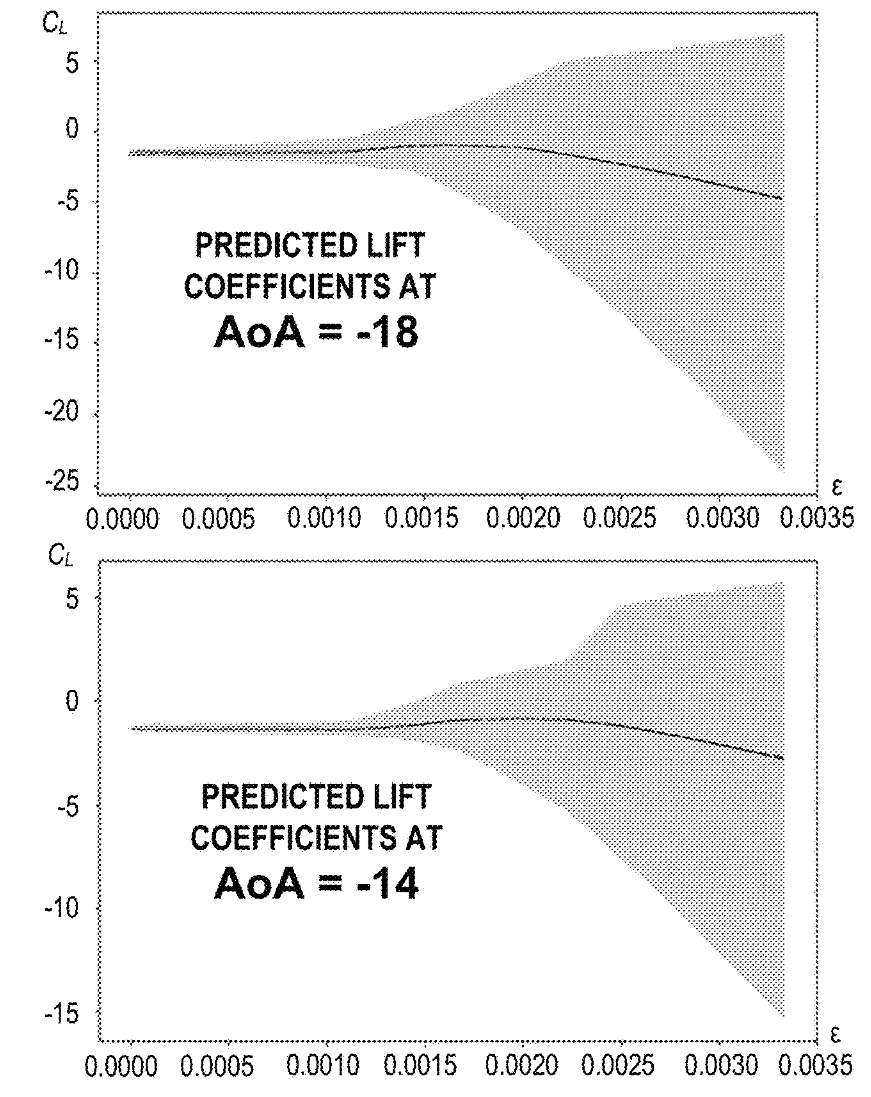
Figure 9B:
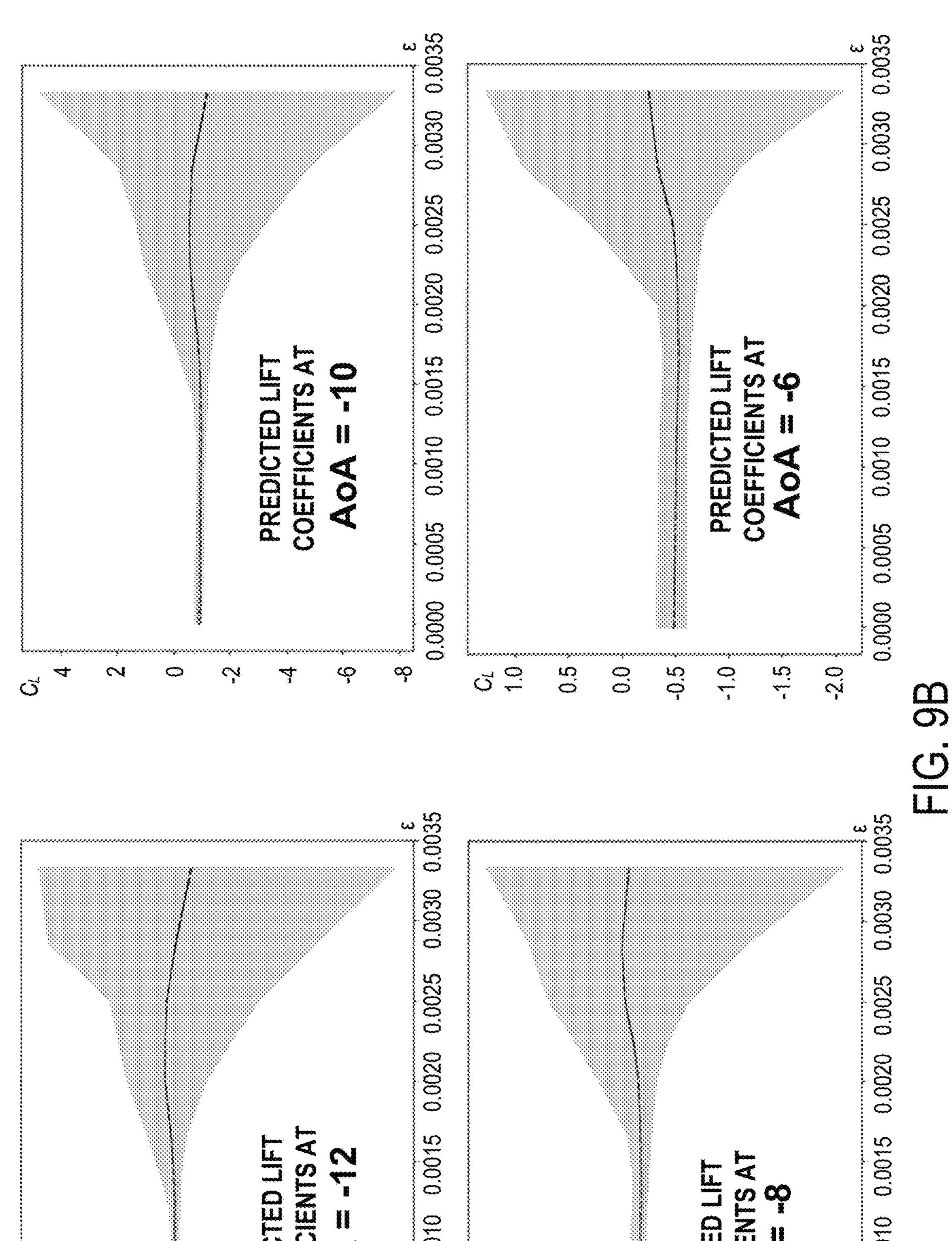
Figure 9C:
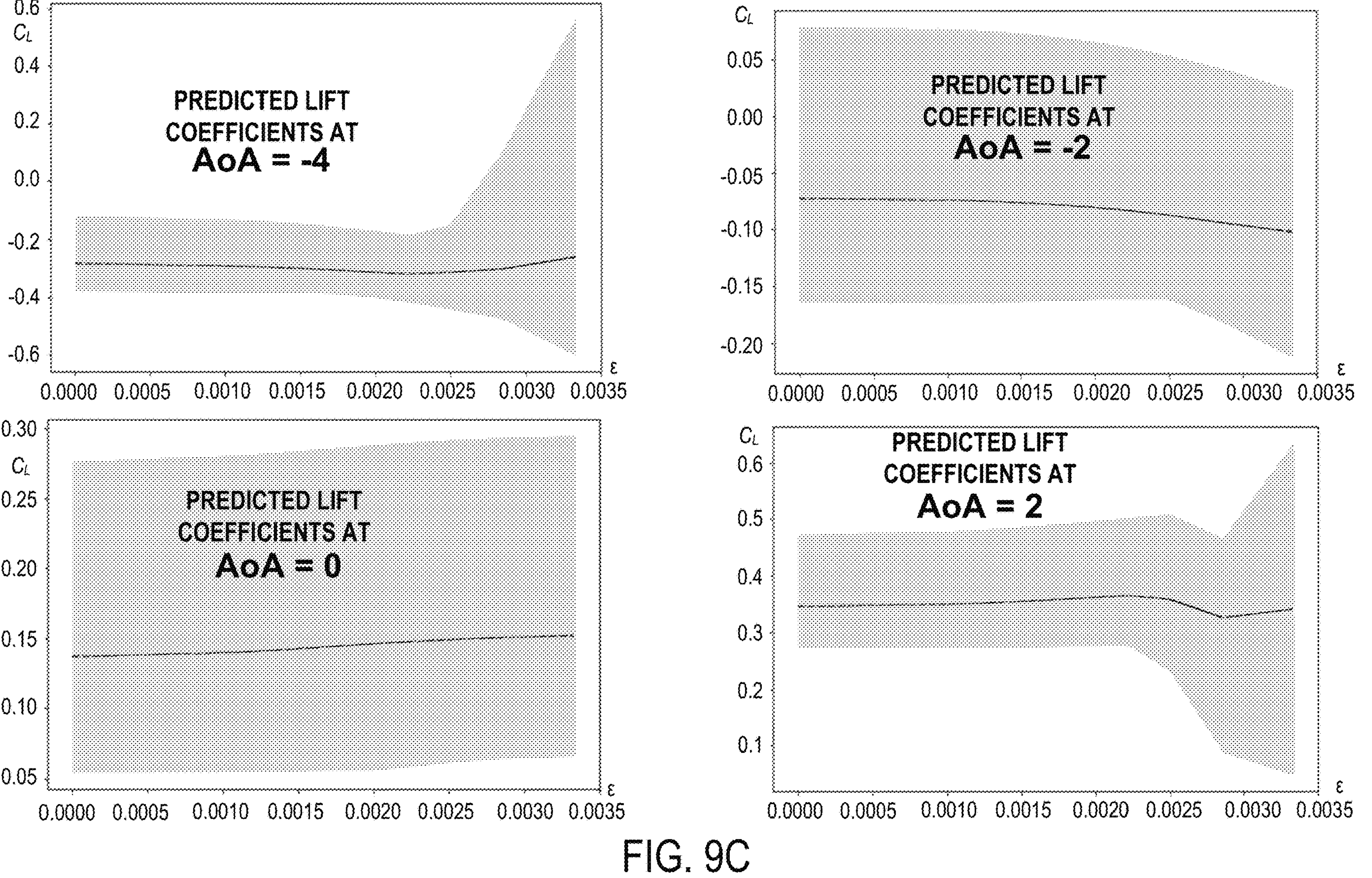
Figure 9D:
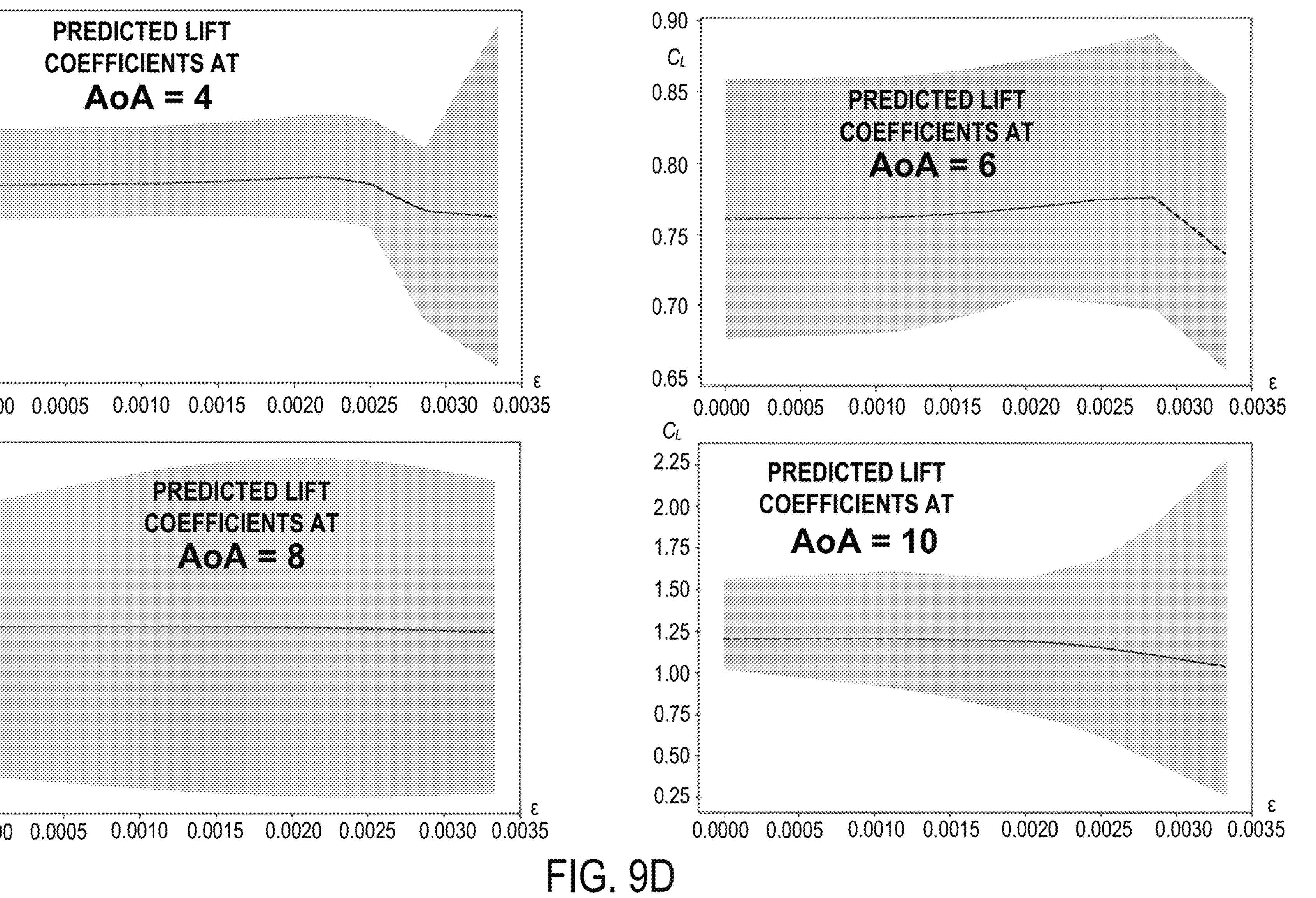
Figure 9E:
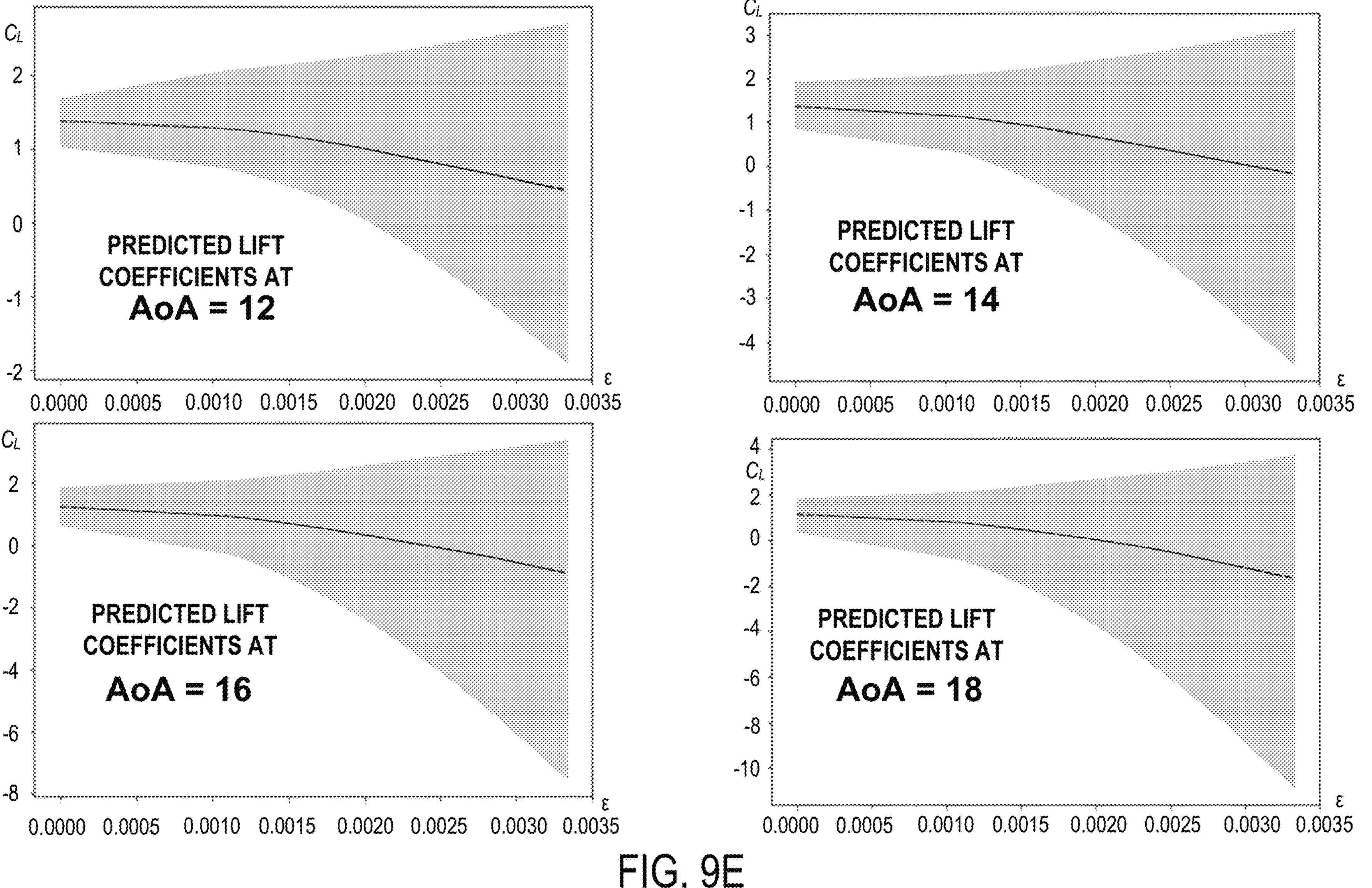

FIG. 9A illustrates four distinct graphs, each of which represents the predicted airfoil lift coefficients 38 in relation to varying scales of perturbation of airfoil geometry. These graphs are generated specifically for four different angles of attack, namely −20, −18, −16, and −14 degrees, with each angle of attack corresponding to a separate graph. FIG. 9B illustrates four distinct graphs, each of which represents the predicted airfoil lift coefficients 38 in relation to varying scales of perturbation of airfoil geometry. These graphs are generated specifically for four different angles of attack, namely −12, −10, −9, and −6 degrees, with each angle of attack corresponding to a separate graph. FIG. 9C illustrates four distinct graphs, each of which represents the predicted airfoil lift coefficients 38 in relation to varying scales of perturbation of airfoil geometry. These graphs are generated specifically for four different angles of attack, namely −4, −2, 0, and 2 degrees, with each angle of attack corresponding to a separate graph. FIG. 9D illustrates four distinct graphs, each of which represents the predicted airfoil lift coefficients 38 in relation to varying scales of perturbation of airfoil geometry. These graphs are generated specifically for four different angles of attack, namely 4, 6, 8, and 10 degrees, with each angle of attack corresponding to a separate graph. FIG. 9E illustrates four distinct graphs, each of which represents the predicted airfoil lift coefficients 38 in relation to varying scales of perturbation of airfoil geometry. These graphs are generated specifically for four different angles of attack, namely 12, 14, 16, and 18 degrees, with each angle of attack corresponding to a separate graph.

Figure 10:
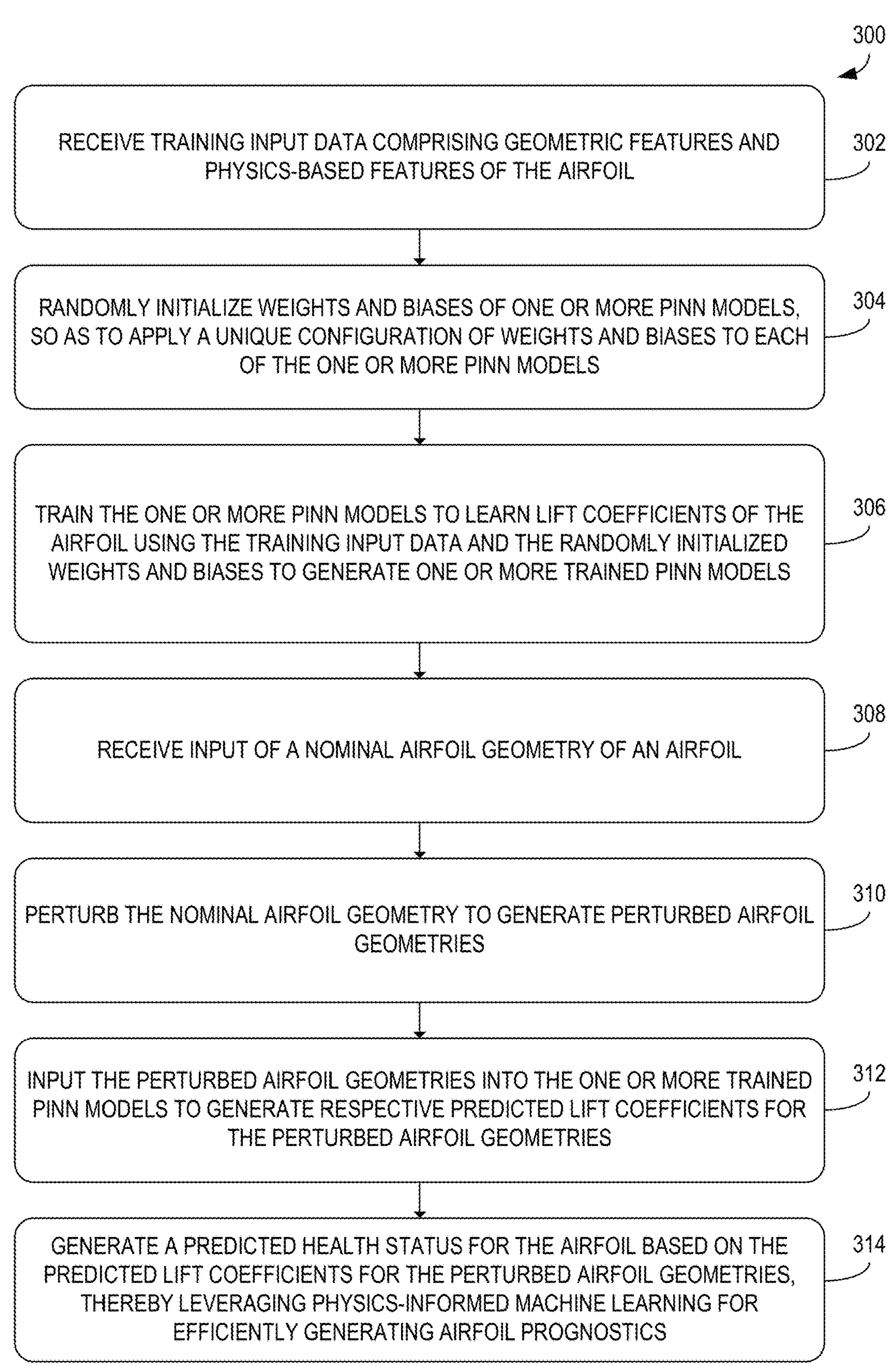
FIG. 10 illustrates a flowchart of a first computerized method according to an example of the present disclosure.

FIG. 10 illustrates a first computerized method 300 for generating a predicted health status for an airfoil. The following description of the first computerized method 300 is provided with reference to the software and hardware components described above and shown in FIGS. 1-9E. It will be appreciated that first computerized method 300 also can be performed in other contexts using other suitable hardware and software components.

At step 302, training input data comprising geometric features and physics-based features of the airfoil is received. At step 304, weights and biases of one or more PINN models are randomly initialized, so as to apply a unique configuration of weights and biases to each of the one or more PINN models. At step 306, the one or more PINN models are trained to learn lift coefficients of the airfoil using the training input data and the randomly initialized weights and biases to generate one or more trained PINN models. At step 308, input of a nominal airfoil geometry of an airfoil is received. At step 310, the nominal airfoil geometry is perturbed to generate perturbed airfoil geometries. At step 312, the perturbed airfoil geometries are inputted into the one or more trained PINN models to generate respective predicted airfoil lift coefficients for the perturbed airfoil geometries. At step 314, a predicted health status is generated for the airfoil based on the predicted airfoil lift coefficients for the perturbed airfoil geometries, thereby leveraging physics-informed machine learning for efficiently generating airfoil prognostics.

Figure 11:
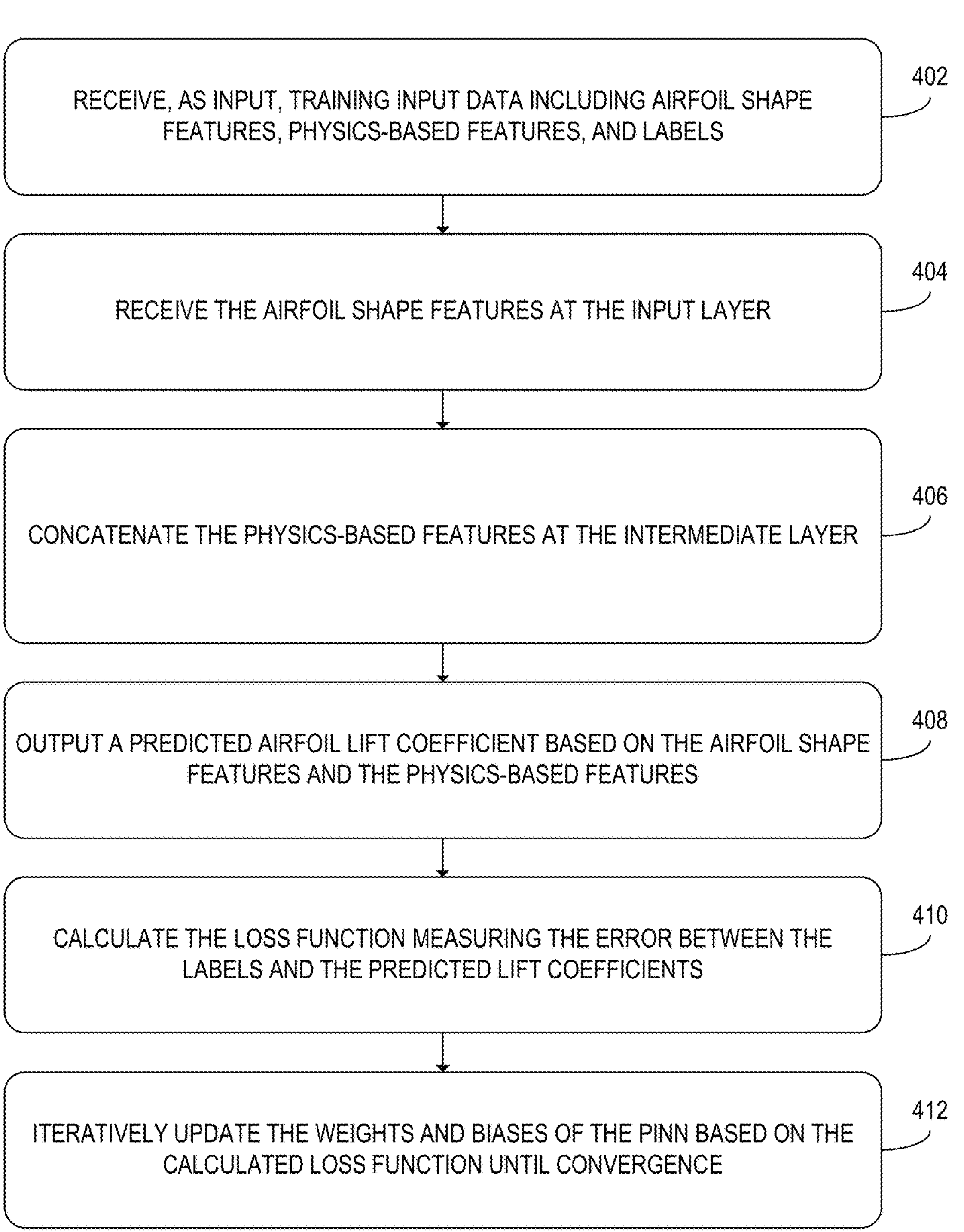
FIG. 11 illustrates a flowchart of a second computerized method according to an example of the present disclosure.

FIG. 11 illustrates a second computerized method 400 for training a physics-informed neural network for generating predicted airfoil lift coefficients. The following description of the second computerized method 400 is provided with reference to the software and hardware components described above and shown in FIGS. 1-9E. It will be appreciated that second computerized method 400 also can be performed in other contexts using other suitable hardware and software components.

At step 402, training input data including airfoil geometric features, physics-based features, and labels are received as input. At step 404, the airfoil geometric features are received at the input layer. At step 406, the physics-based features are concatenated at the intermediate layer. At step 408, a predicted airfoil lift coefficient is outputted based on the airfoil geometric features and the physics-based features. At step 410, the loss function measuring the error between the labels and the predicted airfoil lift coefficients is calculated. At step 412, the weights and biases of the PINN are iteratively updated based on the calculated loss function until convergence, or the minimization of the loss function.

Figure 12:
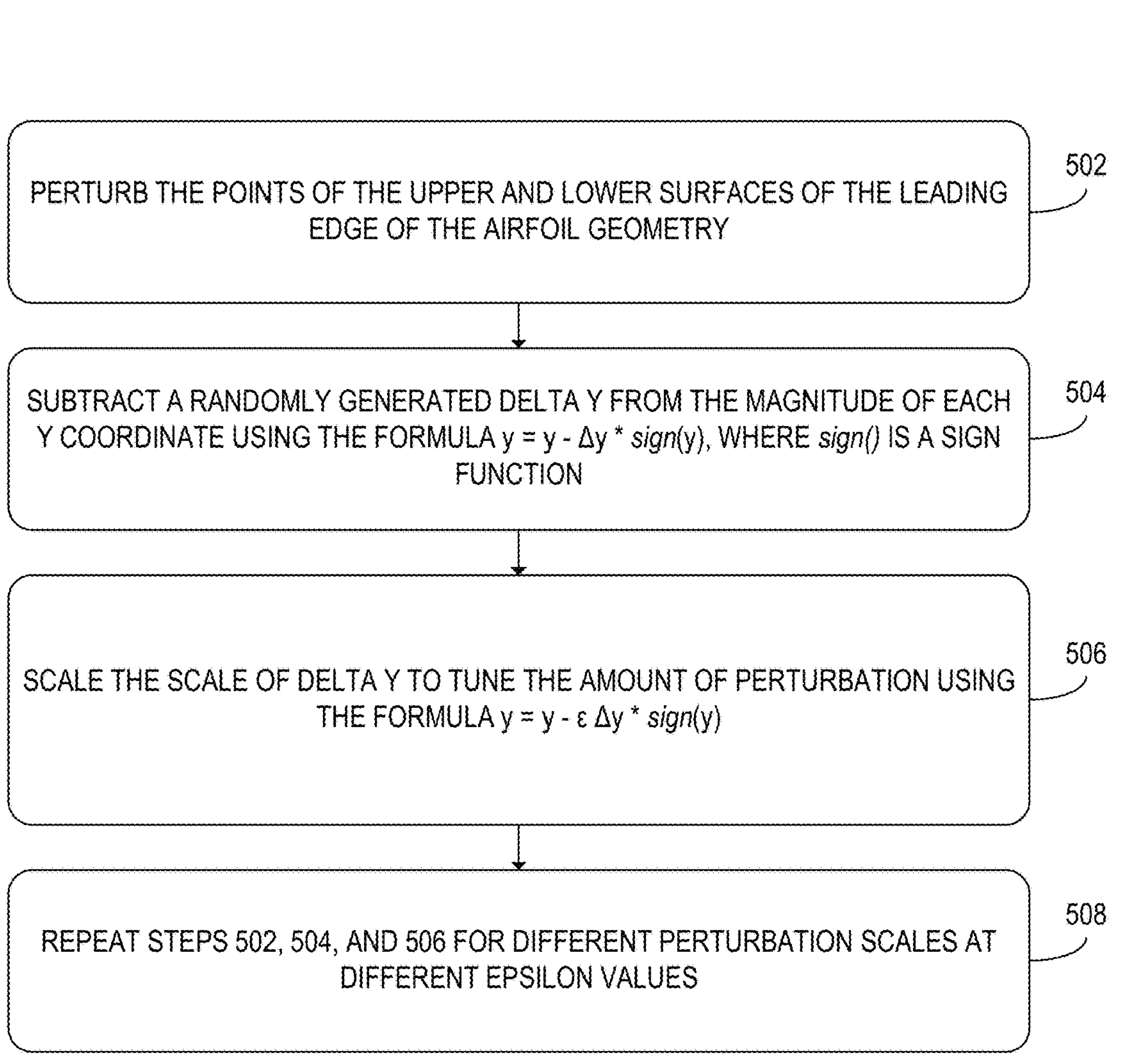
FIG. 12 illustrates a flowchart of a third computerized method according to an example of the present disclosure.

FIG. 12 illustrates a third computerized method 500 which is a leading-edge surface corrosion mechanism for perturbing an airfoil geometry. The following description of the third computerized method 500 is provided with reference to the software and hardware components described above and shown in FIGS. 1-9E. It will be appreciated that third computerized method 500 also can be performed in other contexts using other suitable hardware and software components.

At step 502, the points of the upper and lower surfaces of the leading-edge of the airfoil geometry are perturbed. At step 504, a randomly generated delta y is subtracted from the magnitude of each y coordinate using the formula $y=y-\Delta y*\text{sign}(y)$, where sign( ) is a sign function. At step 506, the scale of delta y is scaled to tune the amount of perturbation using the formula $y=y-\varepsilon*\Delta y*\text{sign}(y)$. At step 508, steps 502, 504, and 506 are repeated for different perturbation scales at different epsilon (ε) values, which can include 1/900, 1/800, 1/700, 1/600, 1/500, 1/450, 1/400, 1/350, and 1/300, for example.

The above-described system and methods for evaluating the health of airfoils leverage physics-informed neural networks for efficient aerodynamic analysis to generate efficient and accurate prognoses of the remaining useful life of airfoils. By using physics-informed neural networks, lift coefficients of airfoils can be inferred without conducting expensive numerical simulations, such as CFD. The inferred airfoil lift coefficients can then be used in impending fault simulations for the aerodynamic force analysis of damaged airfoils to efficiently and accurately generate prognostic health reports of airfoils for different missions.

The methods and processes described herein can be tied to a computing system of one or more computing devices. In particular, such methods and processes can be implemented as an executable computer-application program, a network-accessible computing service, an application-programming interface (API), a library, or a combination of the above and/or other compute resources.

Figure 13:
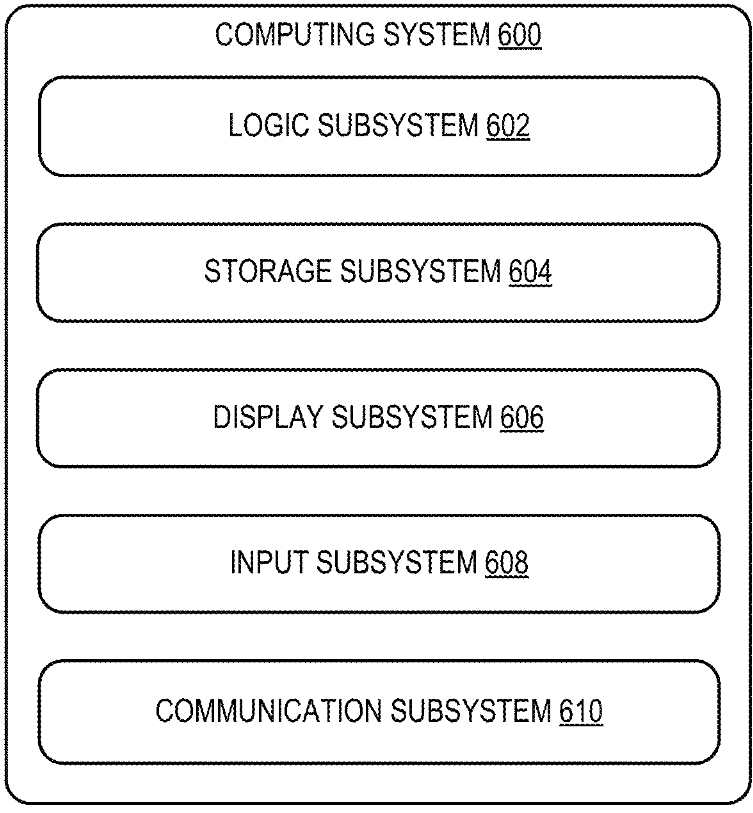
FIG. 13 shows an embodiment of an example computing environment of the present disclosure.

FIG. 13 schematically shows a simplified representation of a computing system 600 configured to provide any to all of the compute functionality described herein. Computing system 600 can take the form of one or more network-accessible devices, server computers, mobile computing devices, Internet of Things (IoT) devices, embedded computing devices, vehicle computing systems, SAR systems, vehicle guidance systems, and/or other computing devices.

Computing system 600 includes a logic subsystem 602 and a storage subsystem 604. Computing system 600 can optionally include a display subsystem 606, input subsystem 608, communication subsystem 610, and/or other subsystems not shown in FIG. 13.

Logic subsystem 602 includes one or more physical devices configured to execute instructions. For example, the logic subsystem can be configured to execute instructions that are part of one or more applications, services, or other logical constructs. The logic subsystem can include one or more hardware processors configured to execute software instructions. Additionally, or alternatively, the logic subsystem can include one or more hardware or firmware devices configured to execute hardware or firmware instructions. Processors of the logic subsystem can be single-core or multi-core, and the instructions executed thereon can be configured for sequential, parallel, and/or distributed processing. Individual components of the logic subsystem optionally can be distributed among two or more separate devices, which can be remotely located and/or configured for coordinated processing. Aspects of the logic subsystem can be virtualized and executed by remotely accessible, networked computing devices configured in a cloud-computing configuration.

Storage subsystem 604 includes one or more physical devices configured to temporarily and/or permanently hold computer information such as data and instructions executable by the logic subsystem. When the storage subsystem includes two or more devices, the devices can be collocated and/or remotely located. Storage subsystem 604 can include volatile, nonvolatile, dynamic, static, read/write, read-only, random-access, sequential-access, location-addressable, file-addressable, and/or content-addressable devices. Storage subsystem 604 can include removable and/or built-in devices. When the logic subsystem executes instructions, the state of storage subsystem 604 can be transformed—e.g., to hold different data.

Aspects of logic subsystem 602 and storage subsystem 604 can be integrated together into one or more hardware-logic components. Such hardware-logic components can include program- and application-specific integrated circuits (PASIC/ASICs), program- and application-specific standard products (PSSP/ASSPs), system-on-a-chip (SOC), and complex programmable logic devices (CPLDs), for example.

The logic subsystem 602 and the storage subsystem 604 can cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine can be instantiated by a single computing device, or a machine can include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality can optionally be saved as one or more unexecuted modules on one or more suitable storage devices.

When included, display subsystem 606 can be used to present a visual representation of data held by storage subsystem 604. This visual representation can take the form of a graphical user interface (GUI). Display subsystem 606 can include one or more display devices utilizing virtually any type of technology. In some implementations, display subsystem can include one or more virtual-, augmented-, or mixed reality displays.

When included, input subsystem 608 can comprise or interface with one or more input devices. An input device can include a sensor device or a user input device. Examples of user input devices include a keyboard, mouse, touch screen, or game controller. In some embodiments, the input subsystem can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 610 can be configured to communicatively couple computing system 600 with one or more other computing devices. Communication subsystem 610 can include wired and/or wireless communication devices compatible with one or more different communication protocols. The communication subsystem can be configured for communication via personal-, local- and/or wide-area networks.

Further, the disclosure comprises configurations according to the following clauses.

Clause 1. A computing system, comprising: a processor; and a memory storing executable instructions that, when executed by the processor, cause the processor to execute: an impending fault simulator configured to: receive input of a nominal airfoil geometry of an airfoil, simulate impending faults in the airfoil by perturbing the nominal airfoil geometry to generate perturbed airfoil geometries, and input the perturbed airfoil geometries into one or more physics-informed neural network (PINN) models to generate respective predicted airfoil lift coefficients for the perturbed airfoil geometries; and a health status evaluator configured to generate a predicted health status for the airfoil based on the predicted airfoil lift coefficients for the perturbed airfoil geometries, thereby leveraging physics-informed machine learning for efficiently generating airfoil prognostics.

Clause 2. The computing system of clause 1, wherein the processor further executes a model trainer configured to train the one or more PINN models to learn lift coefficients of the airfoil using training input data comprising geometric features and physics-based features of the airfoil.

Clause 3. The computing system of clause 2, wherein the physics-based features include at least one selected from the group of angles of attack, Reynolds numbers, simulated lift coefficients, and simulated pressure drag coefficients.

Clause 4. The computing system of clause 2 or 3, wherein the model trainer randomly initializes weights and biases of the one or more PINN models, so as to apply a unique configuration of weights and biases to each of the one or more PINN models.

Clause 5. The computing system of any of clauses 2 to 4, wherein the model trainer uses the training input data and the randomly initialized weights and biases to train the one or more PINN models via a loss function measuring an error between the predicted airfoil lift coefficients and true lift coefficients, the loss function being minimized over iterative updates of the weights and biases.

Clause 6. The computing system of any of clauses 2 to 5, wherein the true lift coefficients are provided from at least one selected from the group of physics experiments, flight tests, wind tunnel experiments, and high-fidelity simulators.

Clause 7. The computing system of any of clauses 1 to 6, wherein the impending fault simulator is configured to generate the perturbed airfoil geometries by using at least one mechanism selected from the group of a random surface deformation mechanism, a leading-edge surface erosion mechanism, a leading-edge surface corrosion mechanism, a trailing-edge surface erosion mechanism, a trailing-edge surface corrosion mechanism, and a combination thereof.

Clause 8. The computing system of any of clauses 1 to 7, wherein the impending fault simulator is configured to quantify uncertainty regions of the predicted airfoil lift coefficients under different operational dimensions.

Clause 9. The computing system of any of clauses 1 to 8, wherein the health status evaluator is configured to generate the predicted health status for the airfoil for each of a plurality of mission-specific requirements.

Clause 10. The computing system of any of clauses 1 to 9, wherein the health status evaluator includes an extreme operation condition identifier configured to use a fault probing strategy to search for plausible fault probing conditions, and use the plausible fault probing conditions to simulate impending faults and generate the predicted health status for the airfoil for each of the plurality of mission-specific requirements.

Clause 11. The computing system of any of clauses 1 to 10, wherein the predicted health status for the airfoil includes a remaining useful life for each of the plurality of mission-specific requirements, the predicted health status for each of the plurality of mission-specific requirements having confidence bounds.

Clause 12. The computing system of any of clauses 1 to 11, wherein the predicted health status for the airfoil further includes one of a plurality of health status categories.

Clause 13. A method, comprising: receiving input of a nominal airfoil geometry of an airfoil, simulating impending faults in the airfoil by perturbing the nominal airfoil geometry to generate perturbed airfoil geometries, and inputting the perturbed airfoil geometries into one or more physics-informed neural network (PINN) models to generate respective predicted airfoil lift coefficients for the perturbed airfoil geometries; and generating a predicted health status for the airfoil based on the predicted airfoil lift coefficients for the perturbed airfoil geometries, thereby leveraging the one or more PINN models to efficiently generate the predicted health status for the airfoil.

Clause 14. The method of clause 13, further comprising training the one or more PINN models to learn lift coefficients of the airfoil using training input data comprising geometric features and physics-based features of the airfoil.

Clause 15. The method of clause 14, wherein the physics-based features include at least one selected from the group of angles of attack, Reynolds numbers, simulated lift coefficients, and simulated pressure drag coefficients.

Clause 16. The method of clause 14 or 15, wherein the perturbed airfoil geometries are generated by using at least one mechanism selected from the group of a random surface deformation mechanism, a leading-edge surface erosion mechanism, a leading-edge surface corrosion mechanism, a trailing-edge surface erosion mechanism, a trailing-edge surface corrosion mechanism, and a combination thereof.

Clause 17. The method of any of clauses 14 to 16, wherein uncertainty regions of the predicted airfoil lift coefficients are quantified under different operational dimensions.

Clause 18. The method of any of clauses 14 to 17, wherein the predicted health status is generated for the airfoil for each of a plurality of mission-specific requirements.

Clause 19. The method of clause 18, wherein a fault probing strategy is used to search for plausible fault probing conditions, and the plausible fault probing conditions are used to simulate impending faults and generate the predicted health status for the airfoil for each of the plurality of mission-specific requirements.

Clause 20. A computing system, comprising: a processor; and a memory storing executable instructions that, when executed by the processor, cause the processor to execute: receive input of a nominal airfoil geometry of an airfoil, simulate impending faults in the airfoil by perturbing the nominal airfoil geometry to generate perturbed airfoil geometries, and generate respective predicted airfoil lift coefficients for the perturbed airfoil geometries; and generate a predicted health status for the airfoil based on the predicted airfoil lift coefficients for the perturbed airfoil geometries, wherein the perturbed airfoil geometries are generated by using at least one mechanism selected from the group of a random surface deformation mechanism, a leading-edge surface erosion mechanism, a leading-edge surface corrosion mechanism, a trailing-edge surface erosion mechanism, a trailing-edge surface corrosion mechanism, and a combination thereof.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

It will be understood by those of ordinary skill in the art without undue experimentation that the configurations and/ or approaches described herein are exemplary in nature, and that these specific implementations or examples are not to be considered in a limiting sense, because numerous variations are possible. The specific routines or methods described herein can represent one or more of any number of processing strategies. As such, various acts illustrated and/or described can be performed in the sequence illustrated and/or described, in other sequences, in parallel, or omitted. Likewise, the order of the above-described processes can be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:

a processor; and a memory storing executable instructions that, when executed by the processor, cause the processor to execute:

an impending fault simulator configured to:

receive input of a nominal airfoil geometry of an airfoil, simulate impending faults in the airfoil by perturbing the nominal airfoil geometry to generate perturbed airfoil geometries, and input the perturbed airfoil geometries into one or more physics-informed neural network (PINN) models to generate respective predicted airfoil lift coefficients for the perturbed airfoil geometries; and a health status evaluator configured to generate a predicted future health status for the airfoil under one or more operational conditions based on the predicted airfoil lift coefficients for the perturbed airfoil geometries, thereby leveraging physics-informed machine learning for efficiently generating airfoil prognostics, wherein the health status evaluator further includes an extreme operation condition identifier configured to use a fault probing strategy to search for plausible fault probing conditions, and use the plausible fault probing conditions to simulate impending faults and generate the predicted future health status for the airfoil under the one or more operational conditions;

the health status evaluator is configured to generate the predicted future health status for the airfoil for each of a plurality of mission-specific requirements; and the extreme operation condition identifier is configured to generate the predicted future health status for the airfoil for each of the plurality of mission-specific requirements.

2. The computing system of claim 1, wherein the processor further executes a model trainer configured to train the one or more PINN models to learn lift coefficients of the airfoil using training input data comprising geometric features and physics-based features of the airfoil.

3. The computing system of claim 2, wherein the physics-based features include at least one selected from the group of angles of attack, Reynolds numbers, simulated lift coefficients, and simulated pressure drag coefficients.

4. The computing system of claim 2, wherein the model trainer randomly initializes weights and biases of the one or more PINN models, so as to apply a unique configuration of weights and biases to each of the one or more PINN models.

5. The computing system of claim 4, wherein the model trainer uses the training input data and the randomly initialized weights and biases to train the one or more PINN models via a loss function measuring an error between the predicted airfoil lift coefficients and true lift coefficients, the loss function being minimized over iterative updates of the weights and biases.

6. The computing system of claim 5, wherein the true lift coefficients are provided from at least one selected from the group of physics experiments, flight tests, wind tunnel experiments, and high-fidelity simulators.

7. The computing system of claim 1, wherein the impending fault simulator is configured to generate the perturbed airfoil geometries by using at least one mechanism selected from the group of a random surface deformation mechanism, a leading-edge surface erosion mechanism, a leading-edge surface corrosion mechanism, a trailing-edge surface erosion mechanism, a trailing-edge surface corrosion mechanism, and a combination thereof.

8. The computing system of claim 1, wherein the impending fault simulator is configured to quantify uncertainty regions of the predicted airfoil lift coefficients under different operational dimensions.

9. The computing system of claim 1, wherein the predicted future health status for the airfoil includes a remaining useful life for each of the plurality of mission-specific requirements, the predicted future health status for each of the plurality of mission-specific requirements having confidence bounds.

10. The computing system of claim 9, wherein the predicted future health status for the airfoil further includes one of a plurality of health status categories.

11. A method, comprising:

receiving input of a nominal airfoil geometry of an airfoil, simulating impending faults in the airfoil by perturbing the nominal airfoil geometry to generate perturbed airfoil geometries, and inputting the perturbed airfoil geometries into one or more physics-informed neural network (PINN) models to generate respective predicted airfoil lift coefficients for the perturbed airfoil geometries; and generating a predicted future health status for the airfoil under one or more operational conditions for each of a plurality of mission-specific requirements based on the predicted airfoil lift coefficients for the perturbed airfoil geometries, thereby leveraging the one or more PINN models to efficiently generate the predicted future health status for the airfoil, wherein the predicted future health status for the airfoil under the one or more operational conditions is generated by using a fault probing strategy to search for plausible fault probing conditions for each of the plurality of mission-specific requirements, and use the plausible fault probing conditions to simulate impending faults.

12. The method of claim 11, further comprising training the one or more PINN models to learn lift coefficients of the airfoil using training input data comprising geometric features and physics-based features of the airfoil.

13. The method of claim 12, wherein the physics-based features include at least one selected from the group of angles of attack, Reynolds numbers, simulated lift coefficients, and simulated pressure drag coefficients.

14. The method of claim 12, wherein the training includes randomly initializing weights and biases of the one or more PINN models, so as to apply a unique configuration of weights and biases to each of the one or more PINN models.

15. The method of claim 14, wherein the training includes using the training input data and the randomly initialized weights and biases to train the one or more PINN models via a loss function measuring an error between the predicted airfoil lift coefficients and true lift coefficients, the loss function being minimized over iterative updates of the weights and biases.

16. The method of claim 15, wherein the true lift coefficients are provided from at least one selected from the group of physics experiments, flight tests, wind tunnel experiments, and high-fidelity simulators.

17. The method of claim 11, wherein the perturbed airfoil geometries are generated by using at least one mechanism selected from the group of a random surface deformation mechanism, a leading-edge surface erosion mechanism, a leading-edge surface corrosion mechanism, a trailing-edge surface erosion mechanism, a trailing-edge surface corrosion mechanism, and a combination thereof.

18. The method of claim 11, wherein uncertainty regions of the predicted airfoil lift coefficients are quantified under different operational dimensions.

19. The method of claim 11, wherein the predicted future health status for the airfoil includes a remaining useful life for each of the plurality of mission-specific requirements, the predicted future health status for each of the plurality of mission- specific requirements having confidence bounds.

20. The method of claim 19, wherein the predicted future health status for the airfoil further includes one of a plurality of health status categories.

* * * * *